Nov. 23, 1948.    C. A. DAWSON    2,454,596
PORTABLE RIVETING MACHINE
Filed Jan. 26, 1944    17 Sheets-Sheet 2

INVENTOR.
CHARLES A. DAWSON
BY
George C. Sullivan
AGENT

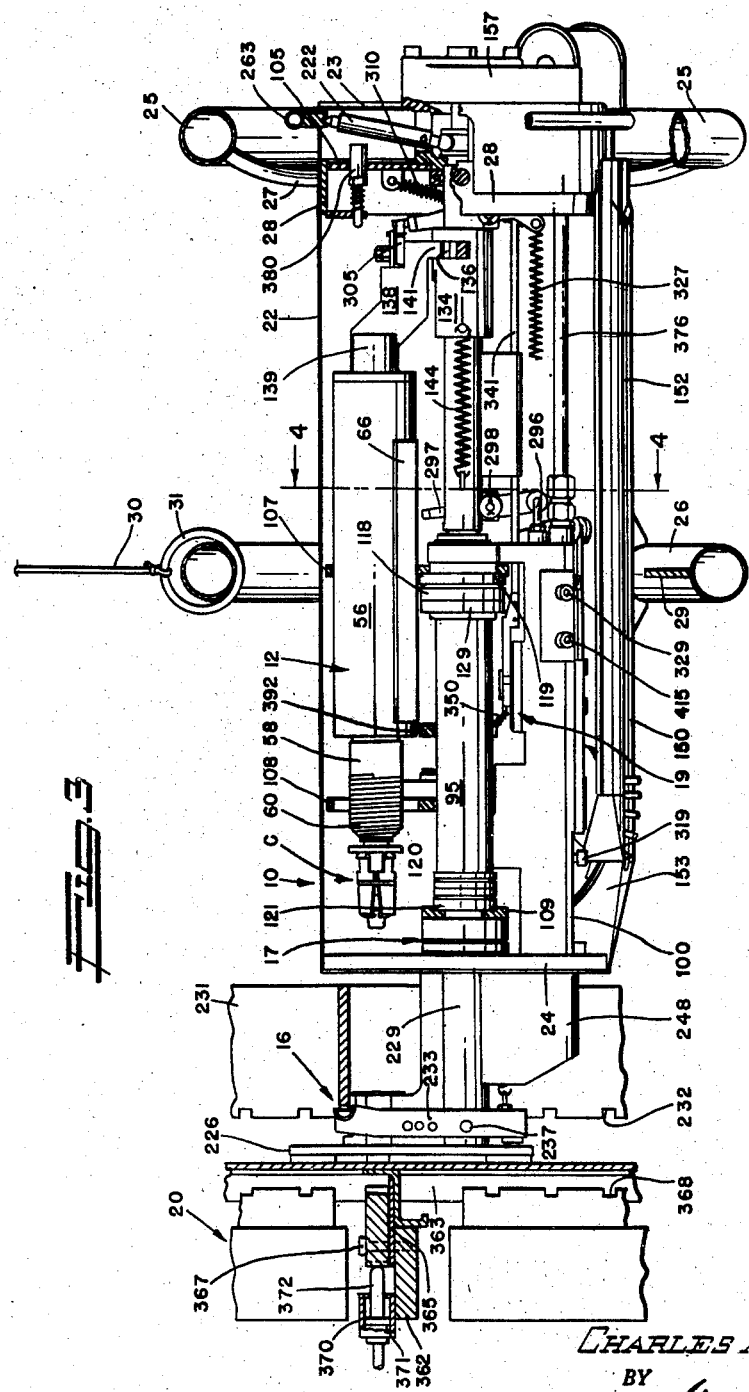

Nov. 23, 1948.  C. A. DAWSON  2,454,596
PORTABLE RIVETING MACHINE
Filed Jan. 26, 1944                                                                 17 Sheets-Sheet 4
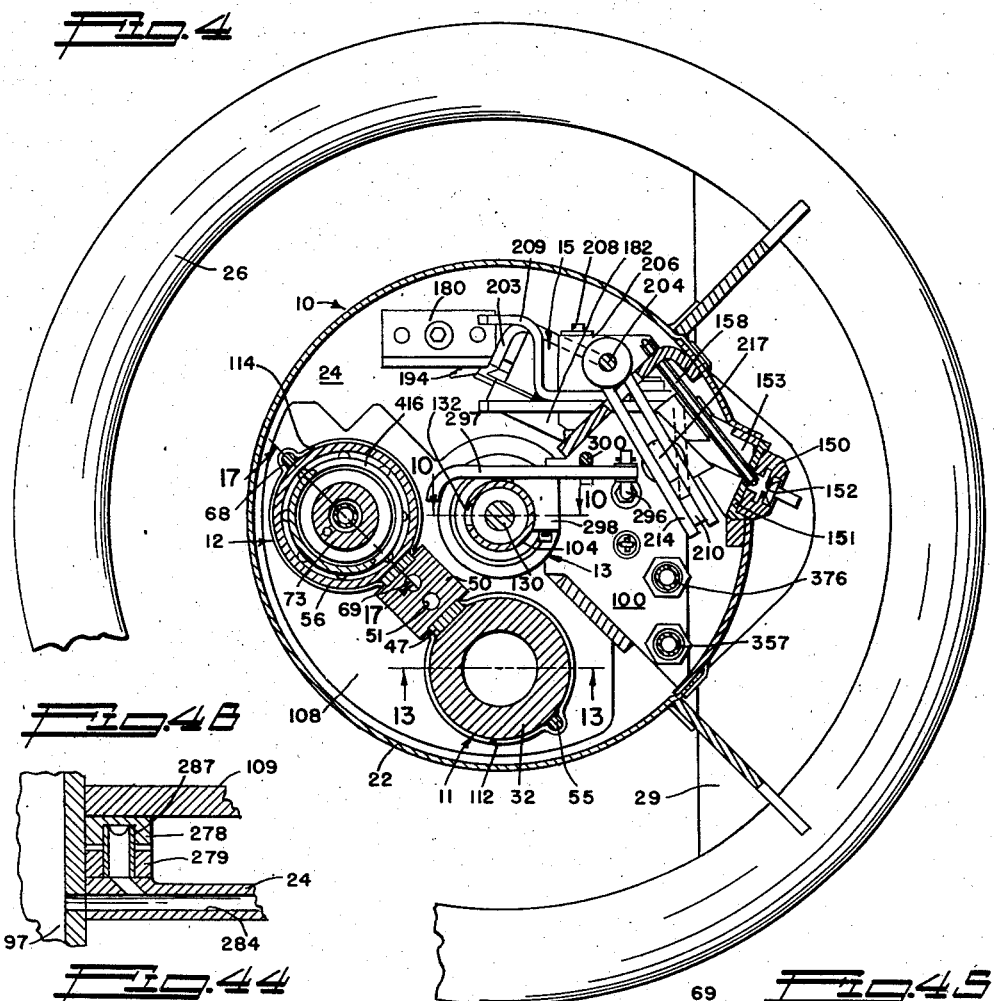
INVENTOR.
CHARLES A. DAWSON
BY
AGENT

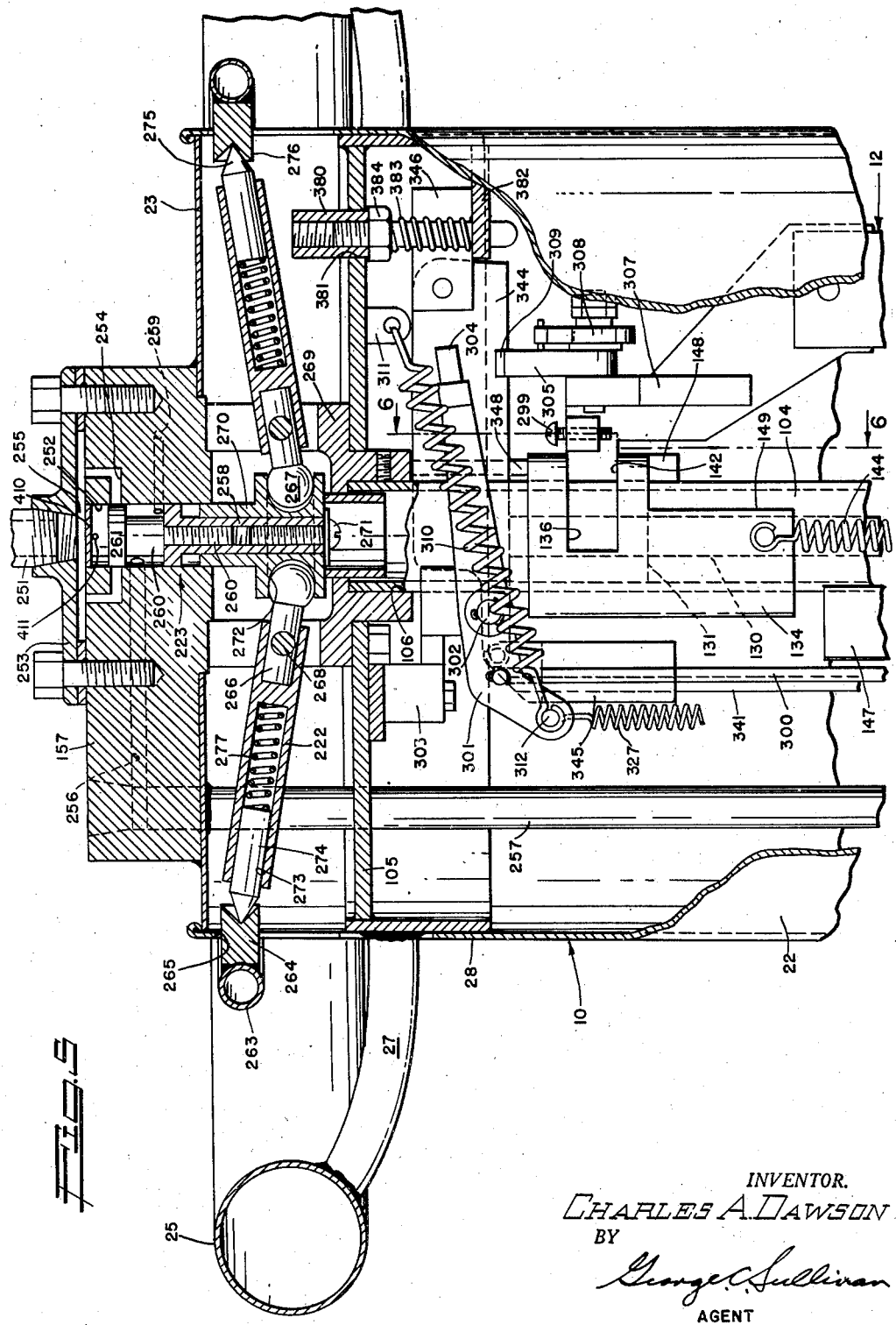

Nov. 23, 1948.  C. A. DAWSON  2,454,596
PORTABLE RIVETING MACHINE
Filed Jan. 26, 1944  17 Sheets-Sheet 6
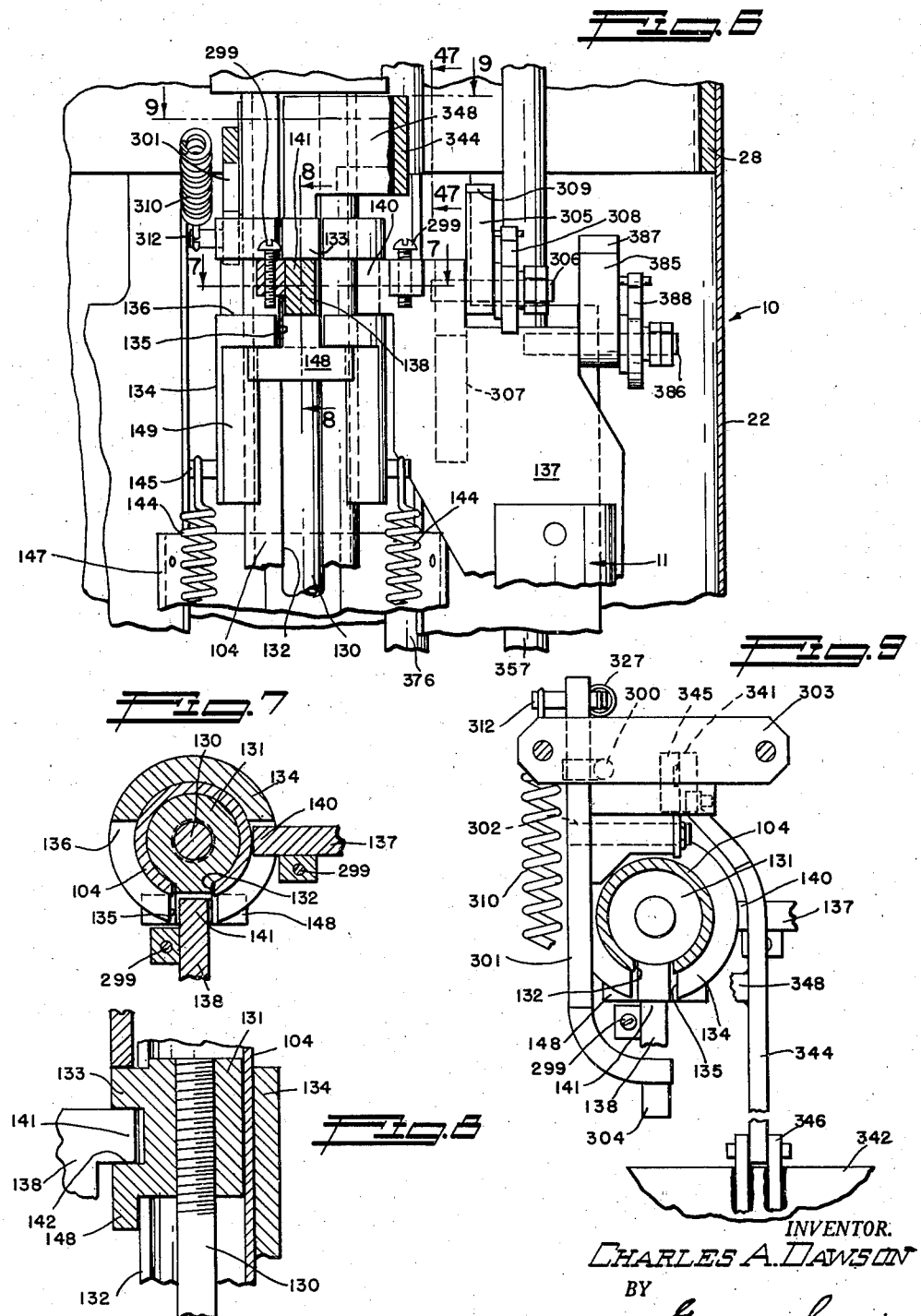
INVENTOR.
CHARLES A. DAWSON
BY
George C. Sullivan
AGENT

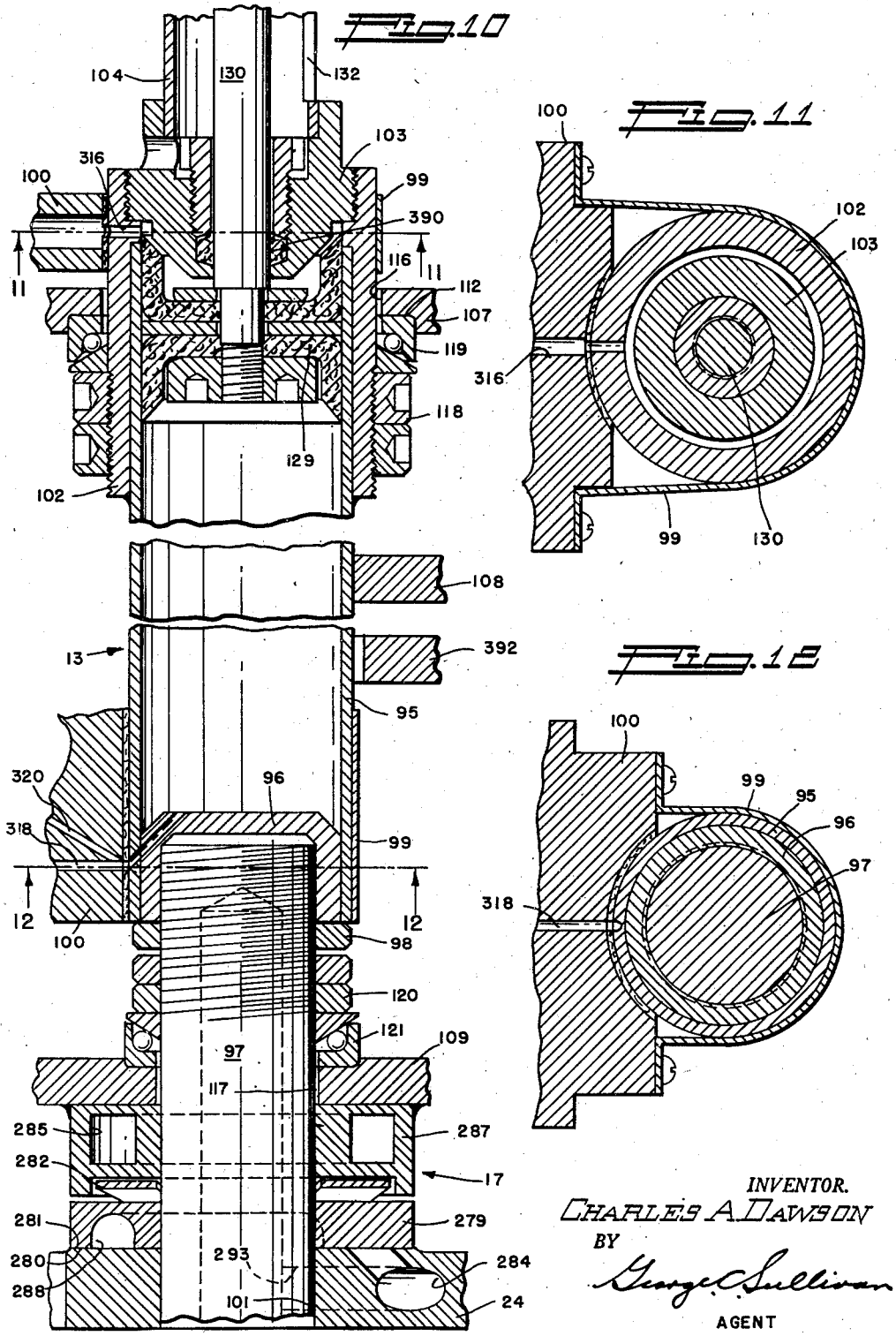

Nov. 23, 1948.　　　　C. A. DAWSON　　　　2,454,596
PORTABLE RIVETING MACHINE
Filed Jan. 26, 1944　　　　17 Sheets-Sheet 8
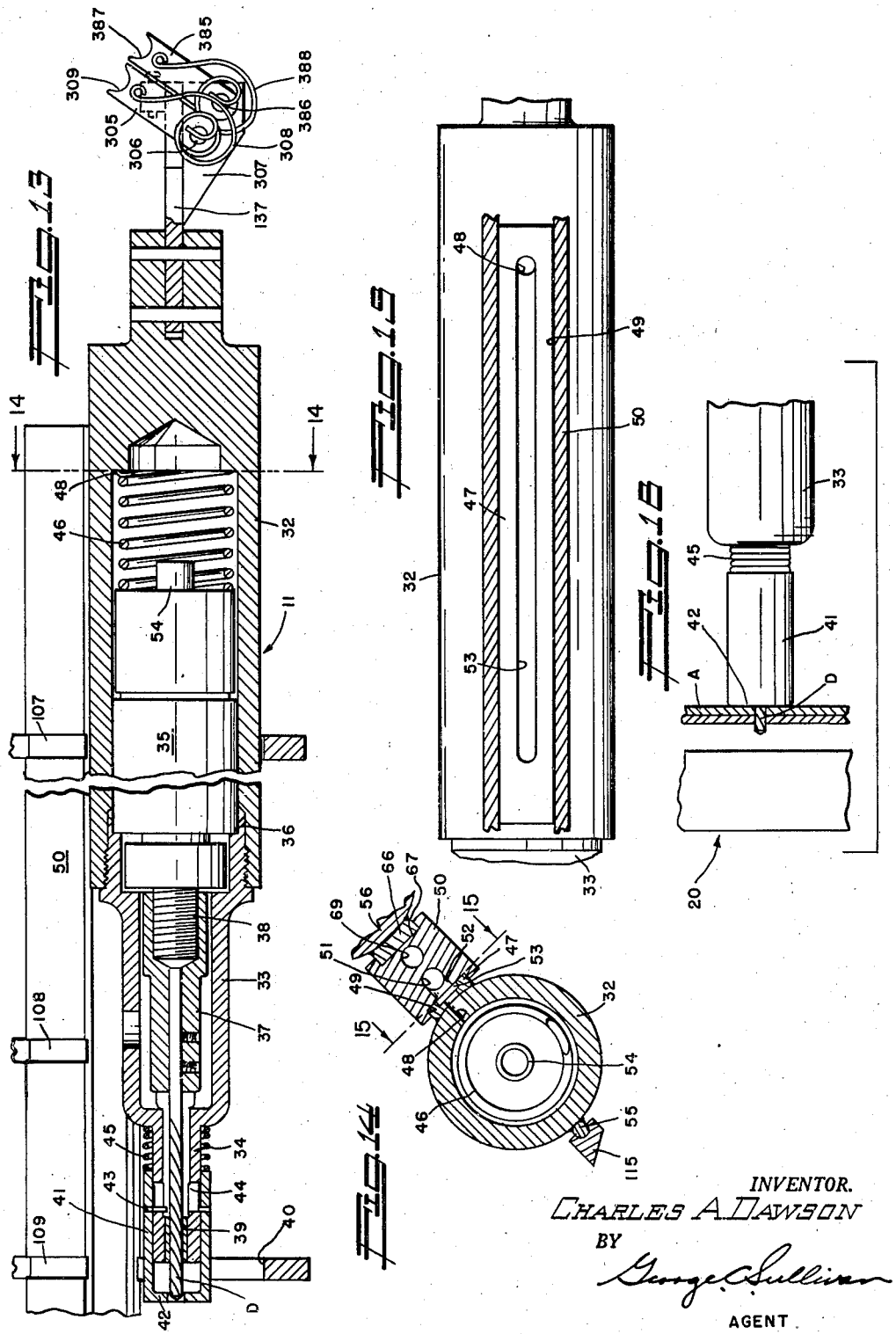
INVENTOR.
CHARLES A. DAWSON
BY
George C. Sullivan
AGENT.

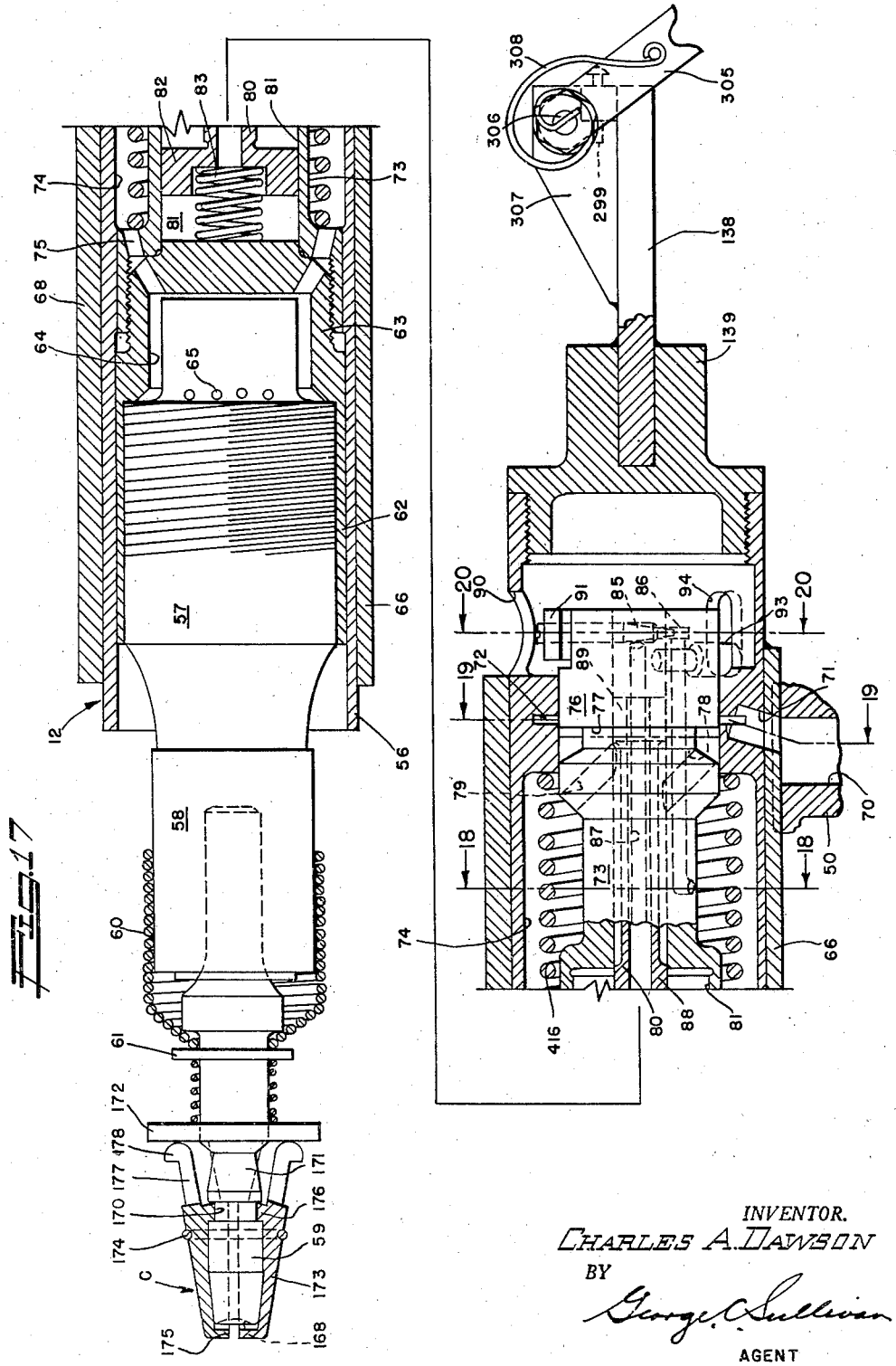

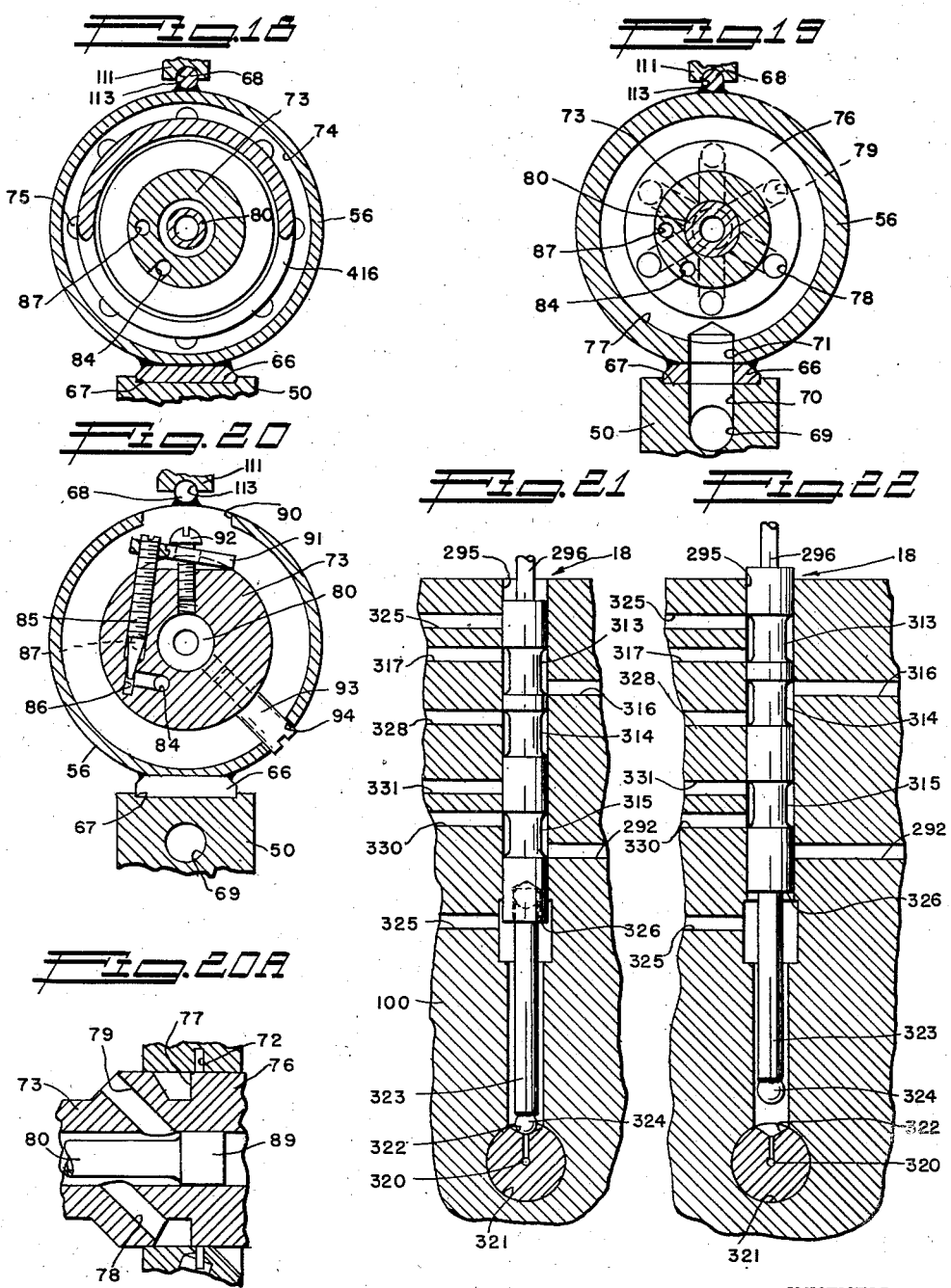

Nov. 23, 1948.  C. A. DAWSON  2,454,596
PORTABLE RIVETING MACHINE
Filed Jan. 26, 1944  17 Sheets-Sheet 11
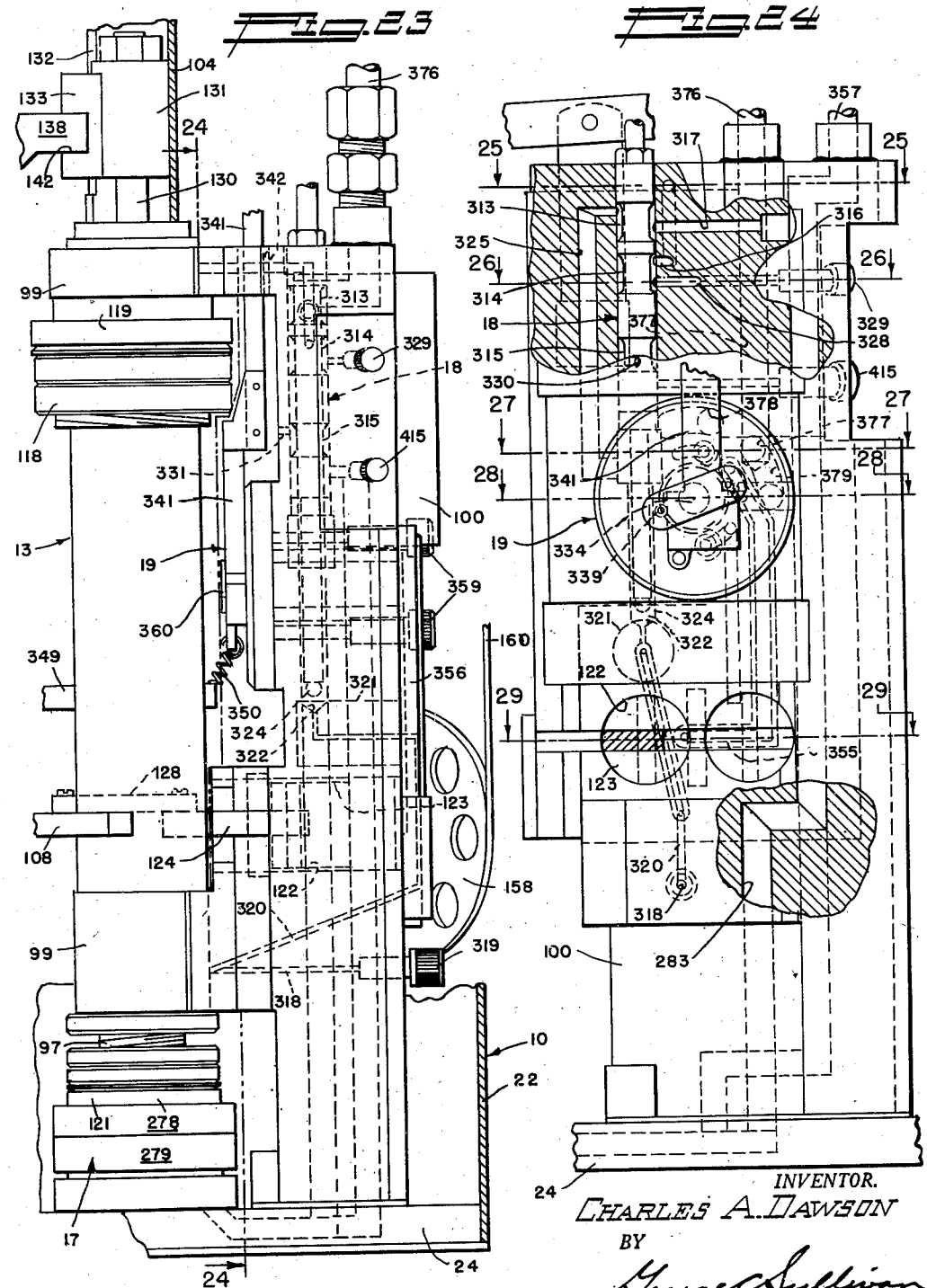
INVENTOR.
CHARLES A. DAWSON
BY
George C. Sullivan
AGENT

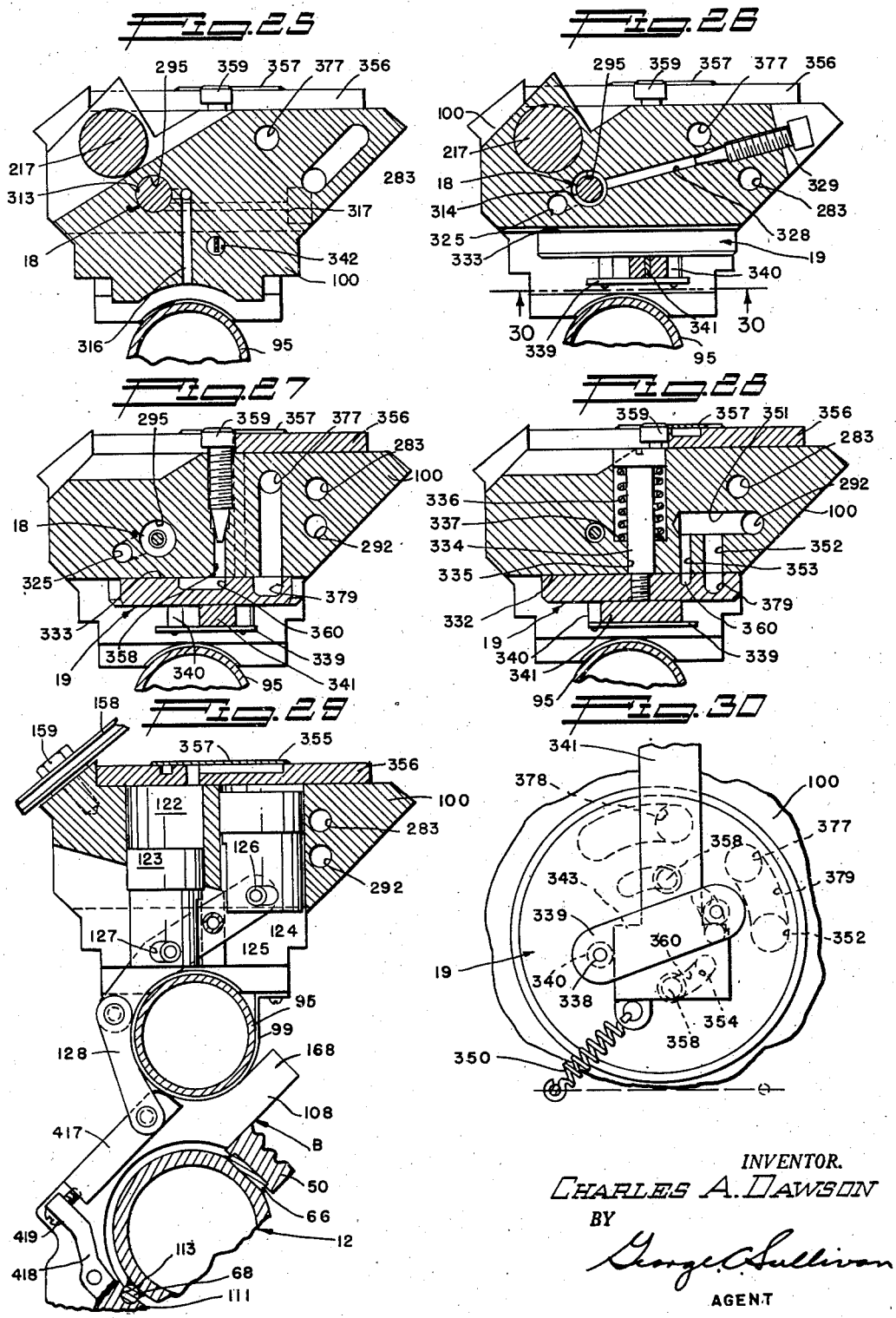

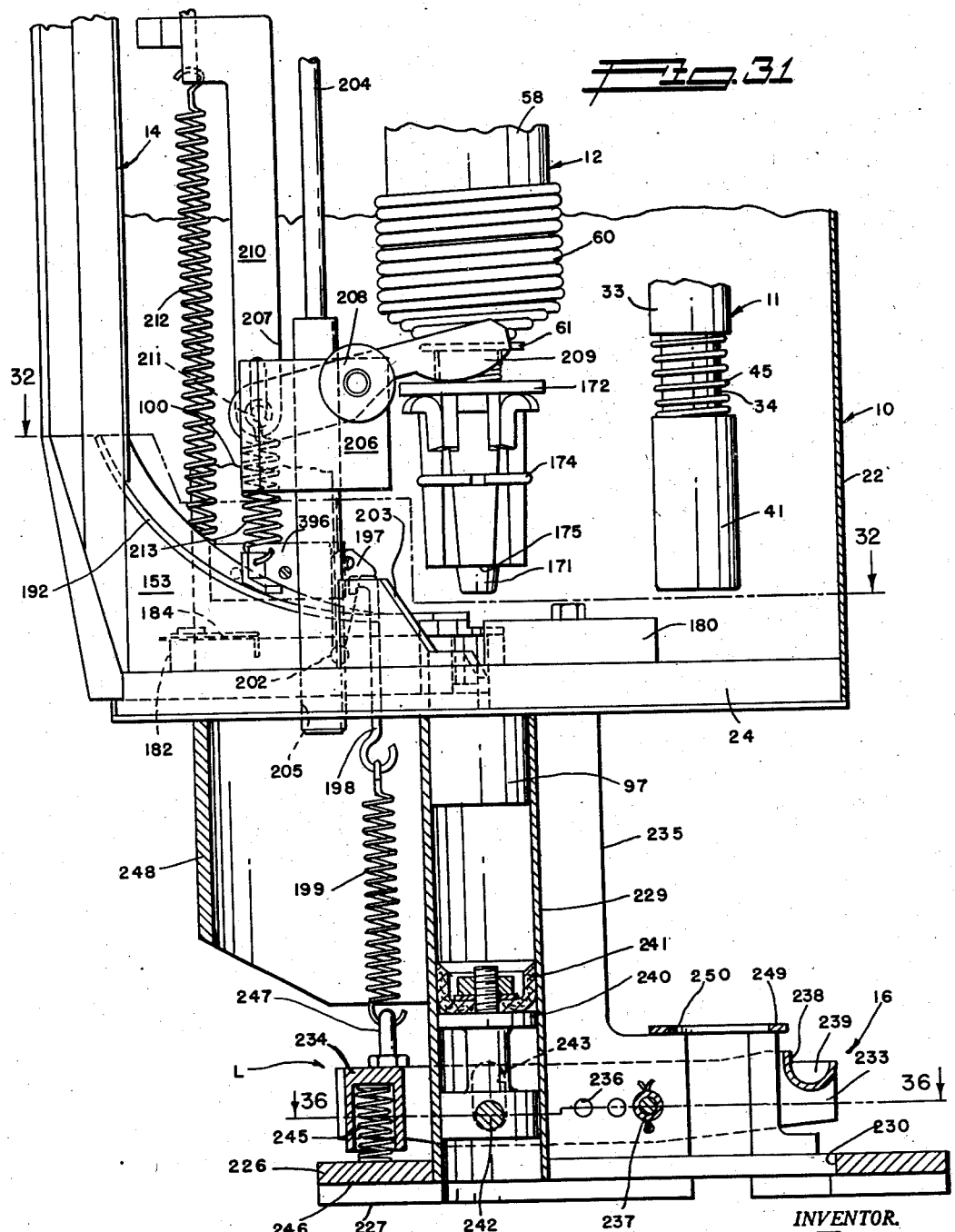

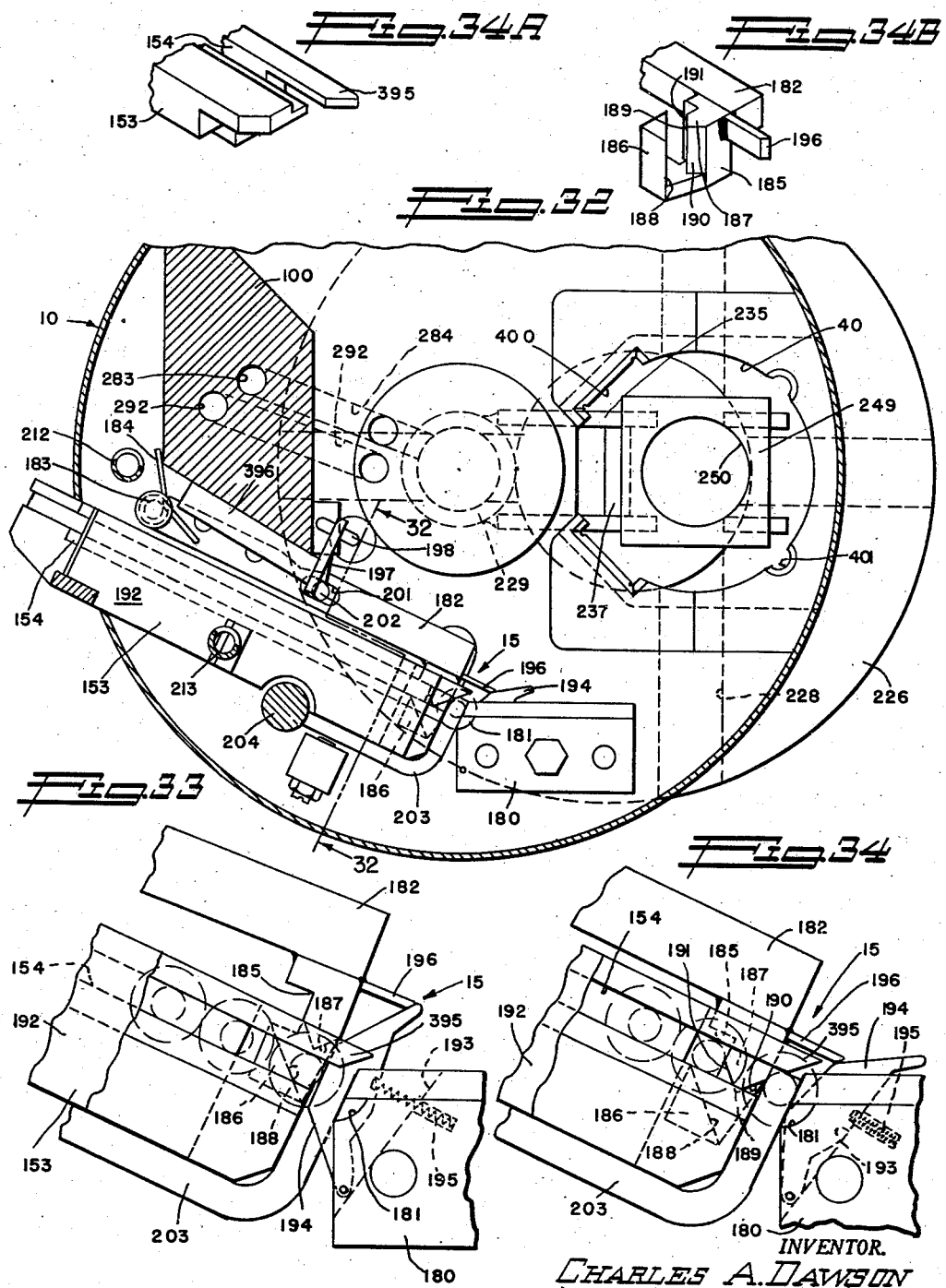

Nov. 23, 1948.　　　　C. A. DAWSON　　　　2,454,596
PORTABLE RIVETING MACHINE
Filed Jan. 26, 1944　　　　17 Sheets-Sheet 15
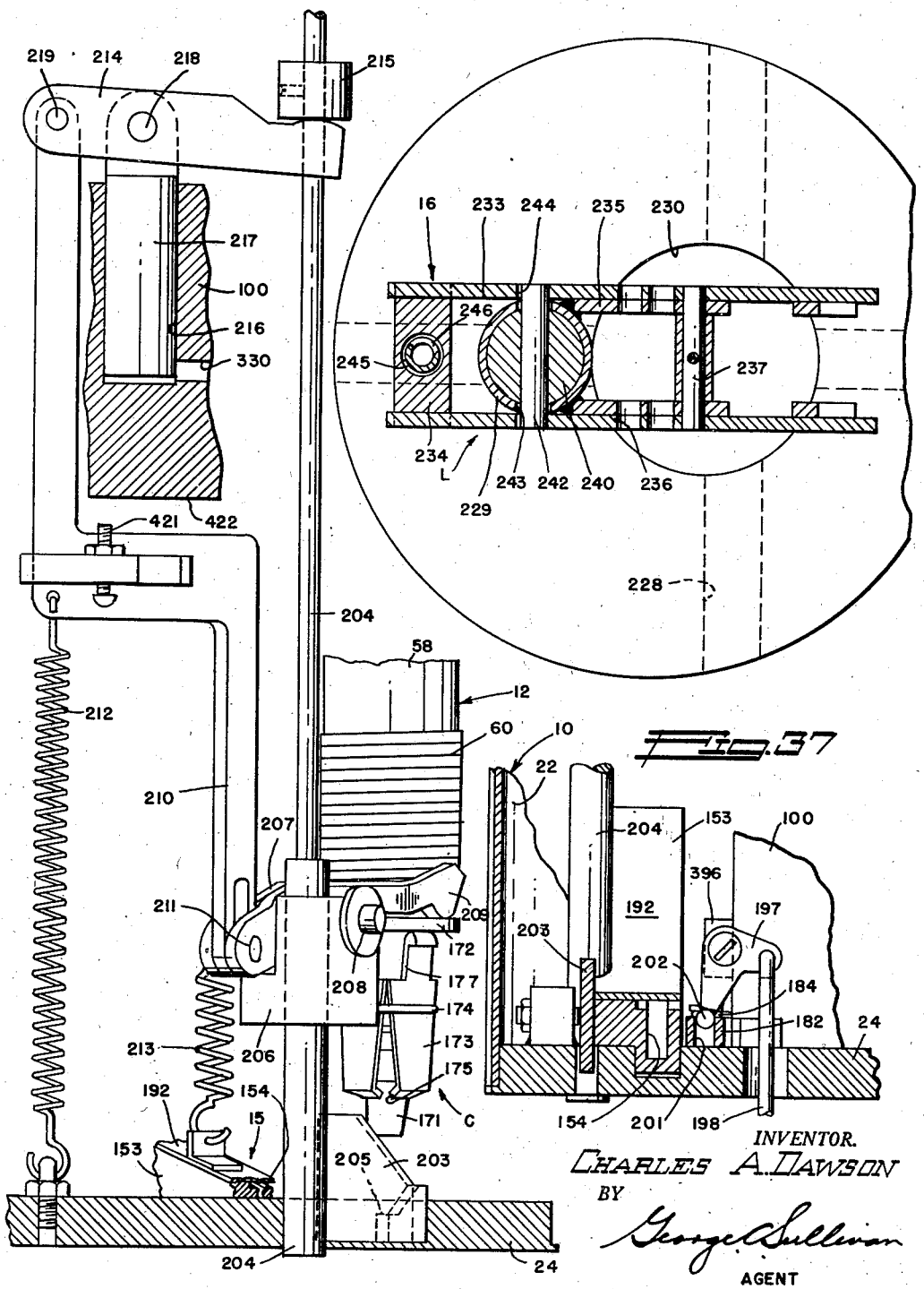
INVENTOR.
CHARLES A. DAWSON
BY
George A. Sullivan
AGENT Nov. 23, 1948.  C. A. DAWSON  2,454,596
PORTABLE RIVETING MACHINE
Filed Jan. 26, 1944  17 Sheets-Sheet 16
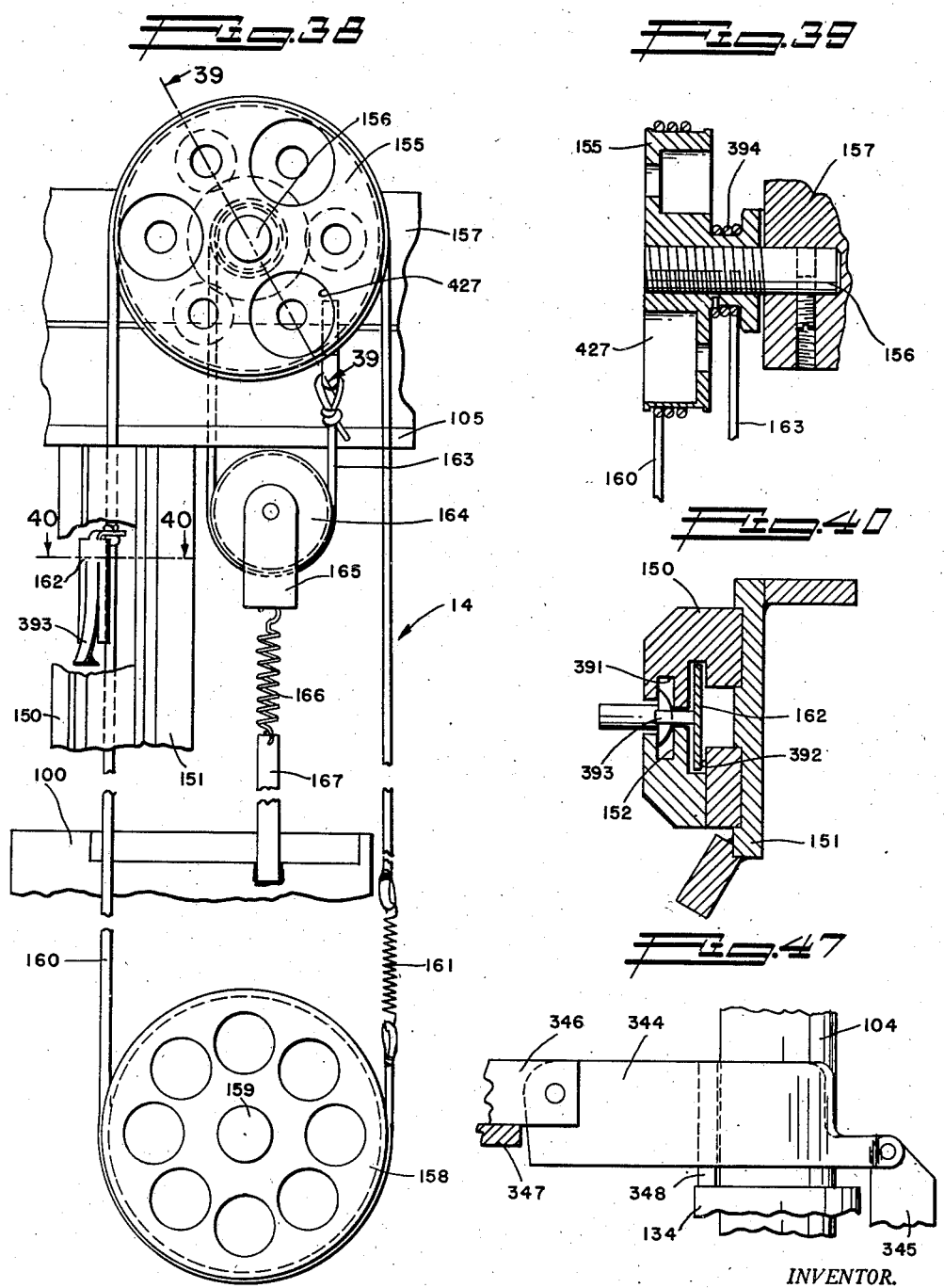
INVENTOR.
CHARLES A. DAWSON
BY
George C. Sullivan
AGENT

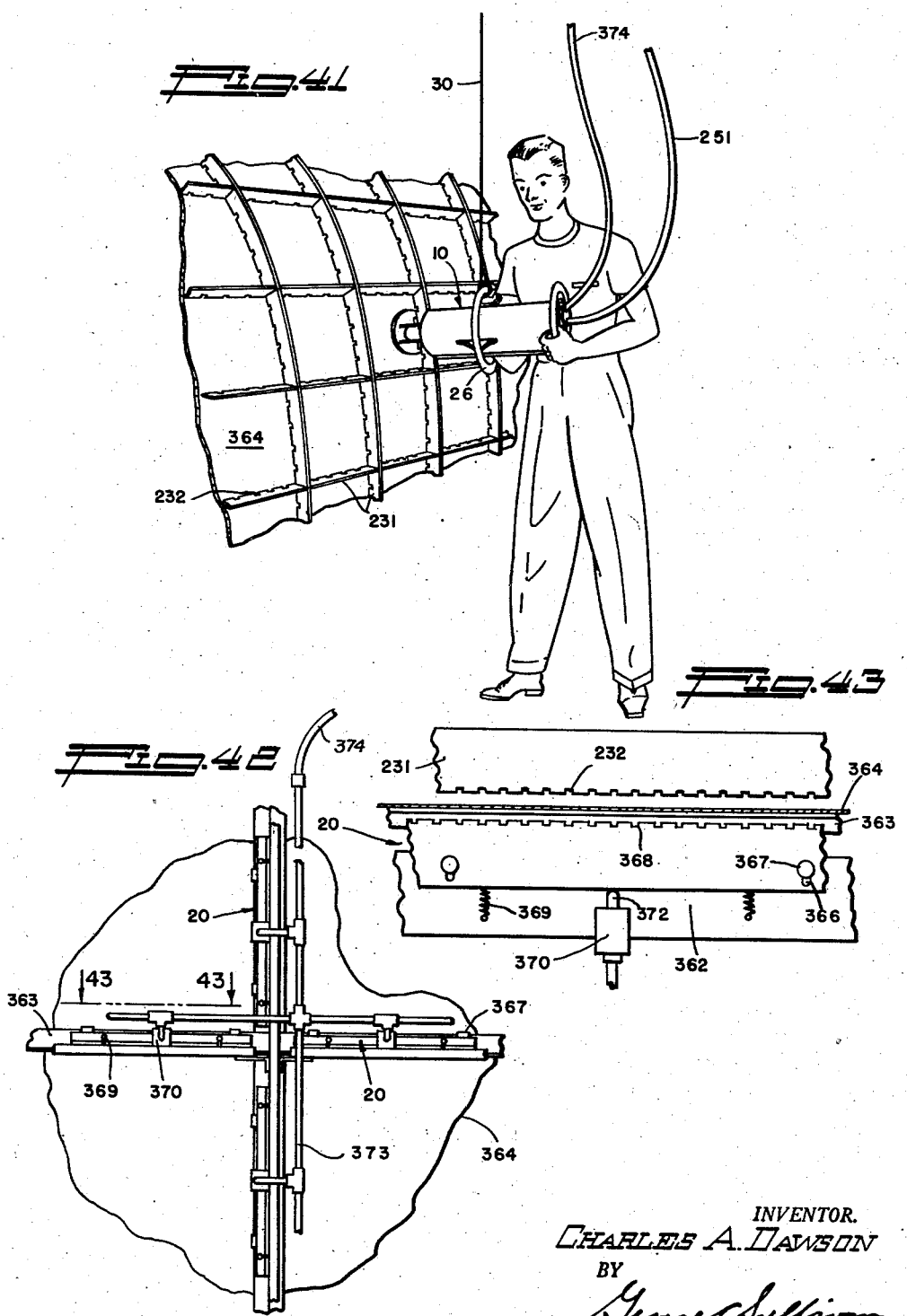

Patented Nov. 23, 1948

2,454,596

UNITED STATES PATENT OFFICE 2,454,596

PORTABLE RIVETING MACHINE

Charles A. Dawson, South Pasadena, Calif., assignor to Lockheed Aircraft Corporation, Burbank, Calif.

Application January 26, 1944, Serial No. 519,738

3 Claims. (Cl. 29—34)

This invention relates to equipment for riveting fabricated assemblies, and relates more particularly to a portable tool or machine operable to provide openings in such assemblies, insert rivets in the openings, and then drive the rivets thus inserted.

In the fabrication of sheet assemblies such as aircraft components, it is the general practice to drill openings in the superimposed parts by means of a portable power driven drilling tool. When the openings have been drilled, the rivets are manually inserted into them and the rivets are then driven. In driving the rivets, one person holds and operates a power driven riveter, and a second operator "bucks" the rivets by holding a bucking bar against the individual rivets at the opposite side of the work assembly. Thus at least three workers are required to perform the sequence of operations. The operations, particularly the riveting and bucking, are tedious and fatiguing and considerable skill and experience are required on the part of the workers. In the riveting operations the rivet set and the bucking bar must be held in the correct positions and the riveting time must be closely gauged to obtain satisfactory results. Even with skillful experienced workers, the rivets are frequently incorrectly driven, with the result that they must be punched out or drilled out so that new rivets may be inserted and driven.

It is a general object of the present invention to provide a practical light weight portable tool operable to automatically drill openings in a work assembly, then insert rivets in the openings thus drilled and then drive the rivets while automatically controlling or operating bars for bucking the rivets.

Another object of the invention is to provide a tool or machine of the character referred to that may be fully controlled by a single inexperienced operator. One inexperienced operator may readily position the machine and initiate its operation by merely moving a suitable handle. The machine or tool then automatically follows through a definite sequence of operations, namely, the drilling of an opening in the work, the placing of a rivet in the opening thus drilled, and the driving or upsetting of the rivet, whereupon the tool terminates its operation and is automatically conditioned for the next cycle of operations. A single unit or tool performs the entire series of operations, avoiding the employment of separate drilling, riveting and bucking tools. No skill is required by the operator and the rivet is correctly driven or upset with no danger of injuring the work sheets.

Another object of this invention is to provide an automatic drilling and riveting tool that is fully portable and capable of operation when in any position. In this respect, the tool of the invention is a distinct departure from the large, cumbersome stationary machines that are now used to some extent to punch openings and drive rivets, such machines being limited to work on flat, horizontal sheets and being incapable of use on vertically positioned work or contoured components.

Another object of the invention is to provide an automatic drilling and riveting machine of the character referred to that is extremely rapid and efficient in operation. The tool is adapted to apply the maximum drill feed pressure, introduces the rivet in a minimum of time, and drives the rivet at a maximum speed. The drill feed pressure and the operating period of the riveter may be regulated to obtain the utmost speed and efficiency with work of any given material and rivets of any given size and material. The human element heretofore required in gauging the drill feed pressure and the rivet driving period is replaced by accurate and readily regulable elements of the tool. The riveting period may be reduced to a minimum to lessen the noise necessarily accompanying the riveting operation.

Another object of the invention is to provide an automatic riveting machine of the character referred to in which the rivets are truly bucked with a uniform pressure, and the rivet set cannot injure the work assembly. The device uniformly shapes the rivet heads without injuring or endangering the sheets or work.

Another object of the invention is to provide an automatic drilling and riveting machine that maintains pressure on the work assembly during the drilling operation to hold the work parts in close contact one with the other so that chips or burrs from the drill cannot enter between the work parts.

Another object of the invention is to provide an automatic riveting machine of the character referred to which carries a multiplicity of rivets, and automatically selects an individual rivet and introduces this rivet into the drilled opening at each operation.

Another object of the invention is to provide a drilling and riveting machine of the class referred to embodying a safety means for automatically preventing subsequent operations of the cycle in the event no rivet is supplied to the rivet chuck of the rivet feed means. The automatic termination of operation informs the operator that the supply of rivets requires replenishing or that the rivet feed or selecting means is malfunctioning, and the automatic termination precludes the possibility of the riveter injuring the work.

Another object of the invention is to provide an automatic riveting tool of the class referred to that is primarily intended for use on panel assemblies in jigs and similar holding means, and may be operated in close proximity to the jig, thus leaving a minimum of rivets to be installed in subsequent manual operations.

A further object of the invention is to provide an automatic drilling and riveting tool that is entirely self contained and which requires only a single source of air under pressure for its full control and operation.

Other objects and features of the invention will be readily understood from the following detailed description of a typical preferred form of the invention in which reference will be made to the accompanying drawings in which—

Figure 3 is a longitudinal detailed sectional view of the tool in its operative horizontal position at the work supporting jig with certain parts appearing in elevation;

Figure 4 is an enlarged transverse detailed sectional view taken as indicated by line 4—4 on Figure 3;

Figure 5 is an enlarged longitudinal sectional view of the outer portion of the portable unit;

Figure 6 is a fragmentary elevation view with certain parts appearing in longitudinal cross section, being a view taken substantially as indicated by line 6—6 on Figure 5;

Figure 7 is a fragmentary transverse detailed sectional view taken as indicated by line 7—7 on Figure 6;

Figure 8 is a fragmentary detailed sectional view taken as indicated by line 8—8 on Figure 6;

Figure 9 is a transverse detailed sectional view taken as indicated by line 9—9 on Figure 6 with certain parts appearing in elevation;

Figure 10 is an enlarged fragmentary longitudinal sectional view of the axial feed cylinder and adjacent parts taken substantially as indicated by line 10—10 on Figure 4;

Figure 11 is a fragmentary transverse detailed sectional view taken as indicated by line 11—11 on Figure 10;

Figure 12 is a fragmentary transverse detailed sectional view taken as indicated by line 12—12 on Figure 10;

Figure 13 is an enlarged longitudinal detailed sectional view of the drilling means, being a view taken as indicated by line 13—13 on Figure 4;

Figure 14 is a transverse detailed sectional view taken as indicated by line 14—14 on Figure 13;

Figure 15 is a fragmentary elevational view of the drilling means taken substantially as indicated by line 15—15 on Figure 14;

Figure 16 is a fragmentary elevational view showing the work in cross section and illustrating the manner in which the drill and pressure sleeve act on the work;

Figure 17 is an enlarged longitudinal detailed sectional view of the riveting means taken as indicated by line 17—17 on Figure 4 with the riveter and other parts appearing in elevation;

Figure 1:
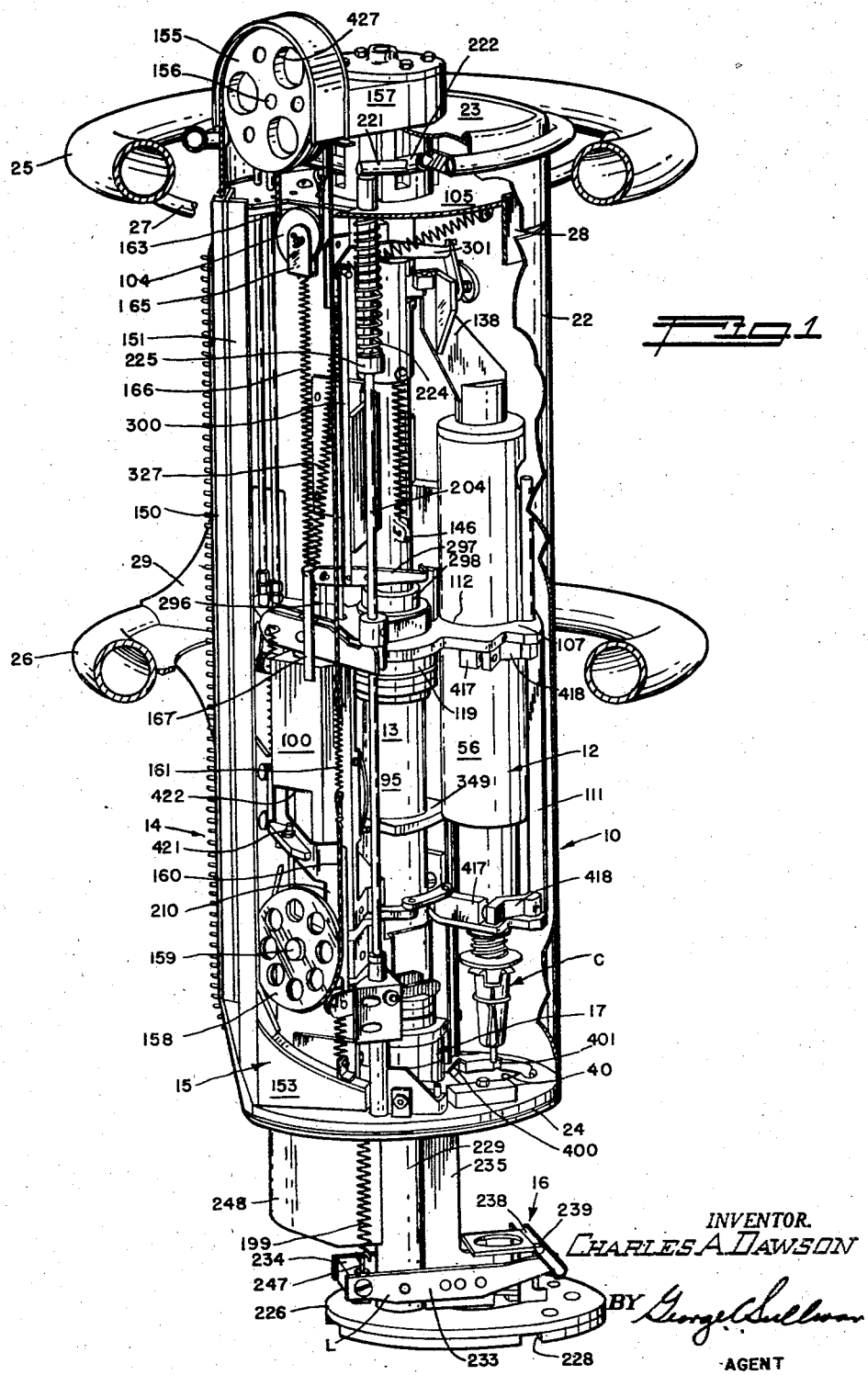
Figure 1 is a perspective view of the portable unit of the invention arranged in an upright position with the wall of the case broken away to expose the internal mechanism.

Figures 18, 19 and 20 are transverse detailed sectional views taken as indicated by lines 18—18, 19—19 and 20—20, respectively, on Figure 17;

Figure 20A is a fragmentary longitudinal detailed sectional view of a portion of the valve mechanism controlling the riveter;

Figures 21 and 22 are schematic sectional views illustrating the two positions of the reciprocating valve;

Figure 23 is an enlarged side elevation of the axial feed cylinder showing one edge or side of the main valve block and associated parts;

Figure 24 is a view taken as indicated by line 24—24 on Figure 23 illustrating the inner face of the valve block with certain portions of the block appearing in longitudinal cross section and showing the selector valve;

Figure 25 is a transverse detailed sectional view of the valve block taken as indicated by line 25—25 on Figure 24;

Figure 26 is a transverse detailed sectional view of the valve block taken as indicated by line 26—26 on Figure 24;

Figure 27 is a transverse detailed sectional view of the valve block taken as indicated by line 27—27 on Figure 24;

Figure 28 is a transverse detailed sectional view of the valve block taken as indicated by line 28—28 on Figure 24;

Figure 29 is a transverse detailed sectional view of the valve block taken as indicated by line 29—29 on Figure 24 illustrating the cylinder and piston mechanism for rotating the carriage;

Figure 30 is an enlarged fragmentary elevational view taken substantially as indicated by line 30—30 on Figure 26;

Figure 31 is an enlarged fragmentary sectional view of the inner portion of the portable unit showing certain parts in longitudinal cross section and other parts in elevation;

Figure 32 is a transverse detailed sectional view taken substantially as indicated by line 32—32 on Figure 31;

Figures 33 and 34 are enlarged fragmentary elevational views of the rivet selecting mechanism in its two operative positions;

Figures 34A and 34B are fragmentary perspective views of elements of the rivet selecting means;

Figure 35 is a more or less schematic elevational view of the rivet feed mechanism;

Figure 36 is a transverse detailed sectional view taken as indicated by line 36—36 on Figure 31;

Figure 37 is a fragmentary longitudinal detailed sectional view taken substantially as indicated by line 37—37 on Figure 32;

Figure 38 is a more or less schematic elevational view of the rivet feed means;

Figure 39 is a sectional view taken as indicated by line 39—39 on Figure 38;

Figure 40 is an enlarged transverse detailed sectional view taken as indicated by line 40—40 on Figure 38;

Figure 41 is a fragmentary perspective view illustrating the manner in which the portable unit is handled;

Figure 42 is a fragmentary elevational view of the inner side of the work and jig illustrating the bucking bar means;

Figure 43 is an enlarged fragmentary sectional view taken as indicated by line 43—43 on Figure 42;

Figure 44 is a fragmentary transverse sectional view illustrating one operative position of the manifold valve;

Figure 45 is a view similar to Figure 42 illustrating another operative position of the manifold valve;

Figure 46 is a fragmentary detailed sectional view taken as indicated by line 46—46 on Figure 44;

Figure 47 is a fragmentary elevational view taken substantially as indicated by line 47—47 on Figure 6.

The drilling and riveting means of the present invention may be said to comprise the following principal elements; a housing or case 10, a drilling means 11 within the case 10, a riveting means 12 within the case 10, means 13 supporting the drilling means, and the means 12 for rotary movement and operable to individually feed the same axially, rivet feed means 14, rivet selector means 15 for receiving rivets from the feed means 14 and for individually supplying them to the riveting means 12, clamp mechanism 16 for releasably securing the tool in the operative position at the work assembly, a manifold valve 17, a reciprocating valve 18, a selector valve 19 and bucking bars 20.

The case 10 serves to house and support the various elements of the portable unit of the machine. In the form of the invention illustrated, the case 10 comprises a generally cylindrical shell 22 provided at its ends with end walls or heads 23 and 24. The shell 22 and end wall 23 may be relatively light gauge sheet stock. The tool is provided with suitable handle means to facilitate its use in operation. A handle ring 25 surrounds the outer portion of the case 10 and a similar handle ring 26 surrounds the intermediate portion of the case. The rings 25 and 26 are preferably continuous, and are spaced radially from the shell 22. Arms 27 extend inwardly from the outer ring 25 and are secured to a sleeve 28 rigidly fixed within the shell 22. A suitable bracket 29 secures the intermediate ring 26 to the shell 10. It is a feature of the invention that the tool may be operated when in any selected or required attitude, and a cable or line 30 may be attached to the ring 26 to assume the weight of the tool so that the operator may handle the device with ease; see Figures 3 and 41. I have shown the cable 30 connected with the ring 26 through the medium of a ring or link 31 which is free to shift along the handle ring.

The drilling means 11 is a power operated unit operable under the control of mechanism, to be later described, to drill an opening in the work assembly A during an initial phase of operation of the tool. The drilling means 11 is an elongate unit arranged longitudinally within the case 10. The means 11 includes an elongate cylinder-like body 32 closed at its outer end; see Figure 13. A reduced tubular extension or nose 33 is threaded into the inner end of the body 32. The end portion 34 of the nose 33 is further reduced in diameter and presents a cylindrical exterior. A standard or conventional air driven drill motor 35 is contained within the body 32 and normally seats against a shoulder 36 of the extension 33. The drill motor 35 may be of the general type disclosed in United States Letters Patent Number 2,060,107. A suitable chuck 37 is removably secured to the shaft 38 of the motor 35 to carry the drill D. The chuck 37 is housed within the nose 33 and the drill D extends outwardly through the reduced extension 34. A guide sleeve or bushing 39 may be provided within the extension 34 to guide the drill D. The longitudinal axis of the drilling means 11 is offset radially from the central longitudinal axis of the tool, and the nose extension 34 and drill D are adapted to be advanced through an offset opening 40 in the case head 24, as will be more fully described, to bring the drill D into engagement with the sheet assembly A.

The invention provides a pressure applying means associated with the drilling unit 11 for applying pressure to the work assembly A before and during the drilling operation to prevent the drill cuttings or chips from entering between the work parts. This means includes a pressure sleeve 41 slidable on the nose extension 34. The pressure sleeve 41 has a flat normal end flange 42 for engaging the work sheet. Pins 43 on the sleeve 41 operate in slots 44 in the nose extension 34 to limit movement of the pressure sleeve 41. A spring 45 is arranged under compression between a shoulder on the nose 33 and the inner end of the sleeve 41 to urge the sleeve outwardly. The parts are related so that the sleeve 41 normally protrudes beyond the drill D. When the drilling means 11 is advanced toward the work assembly A, the pressure sleeve flange 42 comes into contact with the sheet of the assembly to apply pressure to the work assembly. As the advancement continues, the spring 45 compresses and the drill D moves forwardly through the sleeve to drill the opening through the work parts. Figure 16 of the drawings illustrates the pressure sleeve 41 in its active pressure applying position and shows the drill D drilling through the work. The spring urged pressure sleeve 41 hold the work parts in close contact in the area of action of the drill D so that cuttings or chips cannot get between the parts.

It is preferred to mount the drill motor 35 for longitudinal movement in the body 11 and to associate shock absorbing means with the motor so that the drill D may be fed against the work A with considerable speed without endangering the drill. The motor 35 is longitudinally shiftable in the body 32, being guided through engagement with the side wall of the body. A shock absorbing spring 46 is arranged under compression between the motor 35 and the closed end of the body 32 to yieldingly urge the motor against the shoulder 36 and to absorb the shock resulting from initial engagement of the drill D with the work assembly A.

Means is provided to deliver air under pressure to the drill motor 35 during longitudinal movement of the drilling means 11. This means includes a plate or strip 47 fixed to the exterior of the body 32 to extend longitudinally thereof. The strip 47 is generally rectangular in transverse cross section and presents a flat outer surface. A port 48 passes through the wall of the body 32 and the outer portion of the strip 47. The strip 47 is partially received in a groove 49 provided in an elongate bar 50 arranged longitudinally in the case 10; see Figure 14. The bar 50 has a longitudinal port 51 connecting with a lateral port 52, which in turn, communicates with the groove 49. A slot or groove 53 is provided in the strip 47 and extends longitudinally from the port 48. The groove 53 communicates with the lateral port 52 of the bar 50 and the parts are related so that the groove remains in communication with the port throughout the entire stroke of the drilling means 11. Thus air under pressure is delivered from the port 51 to the interior of the body 32 to pass to the air inlet 54 of the drill motor 35. The drill motor 35 exhausts through the tubular nose 33. The above described strip 47 sliding in the groove 49 of the bar 50, aids in guiding the drilling means 11 for longitudinal movement. A cylindrical guide rod 55 is fixed on the exterior of the body 11 to further guide the drilling means 11 as will be hereinafter described.

The riveting means 12 is provided to upset or drive the rivet after the same has been inserted in the opening formed by the drill D. The riveting means 12 is an elongate assembly arranged longitudinally in the case 10 in spaced parallel relation to the drilling means 11, and is illustrated in detail in Figures 17 to 20. The riveting means 12 includes a tubular case 56 and a typical pneumatically operated riveter 57 arranged in the case. The present invention is not primarily concerned with the details of the riveter 57 and it may be assumed that the riveter is of the general type disclosed in United States Patent No. 2,053,676. The riveter 57 extends from the case 56 toward the head 24 and is provided with a chuck 58 which carries a rivet set 59. The rivet set and chuck are equipped with the usual external spring 60 engaging around the chuck 58 and cooperating with a shoulder 61 on the chuck 58. The details of the rivet set 59 will be later described. In accordance with the invention, the riveter 57 is arranged in the case 56 for limited axial movement. I have shown the riveter 57 threaded into a sleeve 62, which in turn slides within the case 56. The sleeve 62 has a head 63 provided with an internal chamber 64 and the inlet ports 65 of the riveter communicate with the chamber.

The riveting means 12 is arranged adjacent the above mentioned bar 50, and a longitudinal strip 66 is fixed to the exterior of the case 56 to slidably operate in a groove 67 in the bar; see Figures 19 and 20. A cylindrical guide rod 68 is secured to the opposite side of the case 56 to assist in guiding the riveting means 12 as will be later described. The means for delivering the actuating air under pressure to the riveter 57 includes a longitudinal air supply port 69 in the bar 50. The port 69 extends to a lateral port 70 which in turn extends to the groove 67. The port 70 is elongated in the direction of the longitudinal axis of the riveting means 12. A port 71 extends through the wall of the case 56 and the strip 66, and is adapted to communicate with the elongated port 70 in the bar 50 throughout the active period of the riveting means 12. The wall of the case 56 is thickened internally in the vicinity of the port 71 and has an annular internal groove 72 which communicates with the lateral port 71.

The means for governing the supply of air to the riveter 57 further includes what I will term a mandrel 73 arranged longitudinally in the case 56; see Figure 17. The mandrel 73 is threaded on the head 63 and extends longitudinally therefrom. The major portion of the tubular mandrel 73 is reduced in external diameter to leave an annular chamber 74 within the case 56. Ports 75 in the head 63 and wall of the mandrel 73 maintain the chamber 74 in communication with the chamber 64. The mandrel 73 is provided with an enlarged portion or head 76 which slidably operates in the thick walled portion of the case 56. An annular groove 77 is provided in the mandrel head 76, and is adapted to have communication with the groove 72 upon longitudinal movement of the case 56 with respect to the riveter 57 and mandrel 73. When the head of a rivet engaged on the set 59 contacts the work assembly A, the travel of the riveter 57 is stopped and continued travel of the case 56 toward the work brings the groove 72 into communication with the groove 77 in the head 76. A diagonal port 78 leads from the annular groove 77 through the wall of the mandrel 73 to the interior of the mandrel. A similar diagonal port 79 leads outwardly through the wall of the mandrel from its interior to the chamber 74. When the groove 72 moves into communication with the groove 77 as above described, air under pressure is admitted to the groove 77 to flow through the port 78 to the interior of the mandrel, thence through the port 79 to the chamber 74, and the ports 75 conduct the air pressure from the chamber 74 to the air inlet chamber 64 of the riveter 57. Thus it will be seen that when downward travel of the riveter 57 is terminated by reason of the engagement of the rivet with the work, actuating air under pressure is delivered from the supply port 69 of the bar 50 to the riveter 57 to put the riveter into operation.

The invention includes regulable means for accurately timing the riveting period so that the machine may be conditioned to drive the rivet in the shortest practical time. The means for timing the riveter 57 includes a stem 80 extending longitudinally through the tubular mandrel 73. The mandrel 73 is enlarged adjacent the head 63 to have a cylinder opening 81. The stem 80 is provided at one end with a piston 82 which operates in the cylinder opening 81. A spring 83 is arranged under compression between the piston 82 and the head 63 to yieldingly urge the stem 80 outwardly. The stem 80 is tubular, and its longitudinal opening leads from one side of the piston 82 to the open outer portion of the case 56. Air pressure acting on the piston 82 is operable to produce independent movement of the stem 80 during the riveting period, and the stem is formed to serve as a valve for terminating the riveting period.

An offset longitudinal port 84 extends through the mandrel 73 to a needle valve 85; see Figure 20. The port 84 extends from the exterior of the mandrel 73 where it communicates with the main chamber 74. Thus part of the actuating air supplied to the chamber 74 is free to flow through the port 84 to the needle valve 85 during the riveting period. The needle valve 85 controls a lateral port 86 which extends between the port 84 and a second offset longitudinal port 87 in the mandrel 73. The second offset port 87 extends to the cylinder opening 81 and the air pressure which passes the needle valve 85 acts upon the piston 82. The piston 82 is moved by this air pressure to compress the spring 83 and move the stem 80 toward the riveter 57. The stem 80 is reduced in external diameter between its ends to leave an annular space within the mandrel 73 and the actuating air from the diagonal port 78 passes through this annular space to the diagonal port 79. The intermediate reduction of the stem 80 leaves heads or valve parts 88 and 89 remaining on the stem 80. The valve part 88 normally closes off communication between the cylinder opening 81 and the interior of the mandrel 73 and the valve part 89 is normally spaced away from the diagonal port 79.

When the air passing the needle valve 85 acts upon the piston 82, the stem 80 slowly moves to the left as seen in Figure 17. This movement continues until the valve part 88 is disengaged from the interior of the mandrel 73. When this occurs, air under pressure from the interior of the mandrel is suddenly allowed to flow directly to the cylinder opening 81 and this air acting on the piston 82, suddenly moves the stem 80 to the left. The accelerated movement of the stem 80 to the left as viewed in Figure 17, brings the valve part 89 to the position where it closes off the inner end of the diagonal port 79. Closing of the port 79 prevents the actuating air pressure from reaching the riveter 57 and thus terminates the riveting cycle. It will be seen that adjustment of the needle valve will determine the speed of movement of the stem 80 and thus determines the length of duration of the riveting period. Air under pressure, remaining in the chamber 81, is free to bleed out through the port 87, valve 85, port 84 and riveting gun 57.

Any selected form of needle valve 85 may be employed. Referring to Figure 20, it will be seen that I have shown a simple screw threaded needle valve whose outer end is slotted for engagement by a screw driver, or the like. An opening 90 is provided in the wall of the case 56 to make the end of the needle valve 85 accessible. A tilted plate 91 is secured to the mandrel head 76 by a screw 92 and the needle valve 85 is screw threaded through an opening in the plate 91. Following adjustment of the needle valve 85 to obtain the selected riveting period, the screw 92 is tightened down so that the tilted plate 91 serves to lock the needle valve in the adjusted position. Means is provided for preventing rotary movement of the riveter 57 and associated parts relative to the case 56. This means comprises a pin 93 projecting from the head 76 and operating in a slot 94 in the wall of the case 56. A spring 416 is arranged in the case 56 to urge the riveter 57 toward the work. When the set 59 is pressed against the rivet in the drilled opening in the work, further advancement of the case 56 results in pressure being applied to the riveter through the medium of the spring 416. This pressure forces the work parts into tight contact for the riveting operation.

The means 13 serves to support the above described drilling and riveting means 11 and 12 for simultaneous rotary motion and is operable to produce alternative axial movement of the drilling and riveting means within the case 10. The means 13 includes a longitudinally extending cylinder 95 centrally disposed within the case 10. The cylinder 95 is stationary and is closed at its inner end by a head 96 threaded on a shaft member 97; see Figure 10. A nut 98 is threaded on the member 97 to clamp against the head 96 and the adjacent end of the cylinder 95. Longitudinally spaced straps 99 engage about the cylinder 95 and secure the cylinder to a valve block 100. The block 100 is rigidly secured to the end plate 24 of the case 10. The above mentioned member 97 continues from the cylinder 95 and passes through a central opening 101 in the end plate 24 to project from the case 10 for the purpose to be later described. A collar 102 is welded or otherwise fixed on the outer portion of the cylinder 95 and a plug or cap 103 is threaded in the collar. A tube 104 is secured in the cap 103 and extends outwardly to a supporting plate 105, which in turn is fixed to the sleeve 28 of the case 10. The end of the tube 104 is secured in a central opening 106 in a cage 269 at the plate 105.

Figure 2:
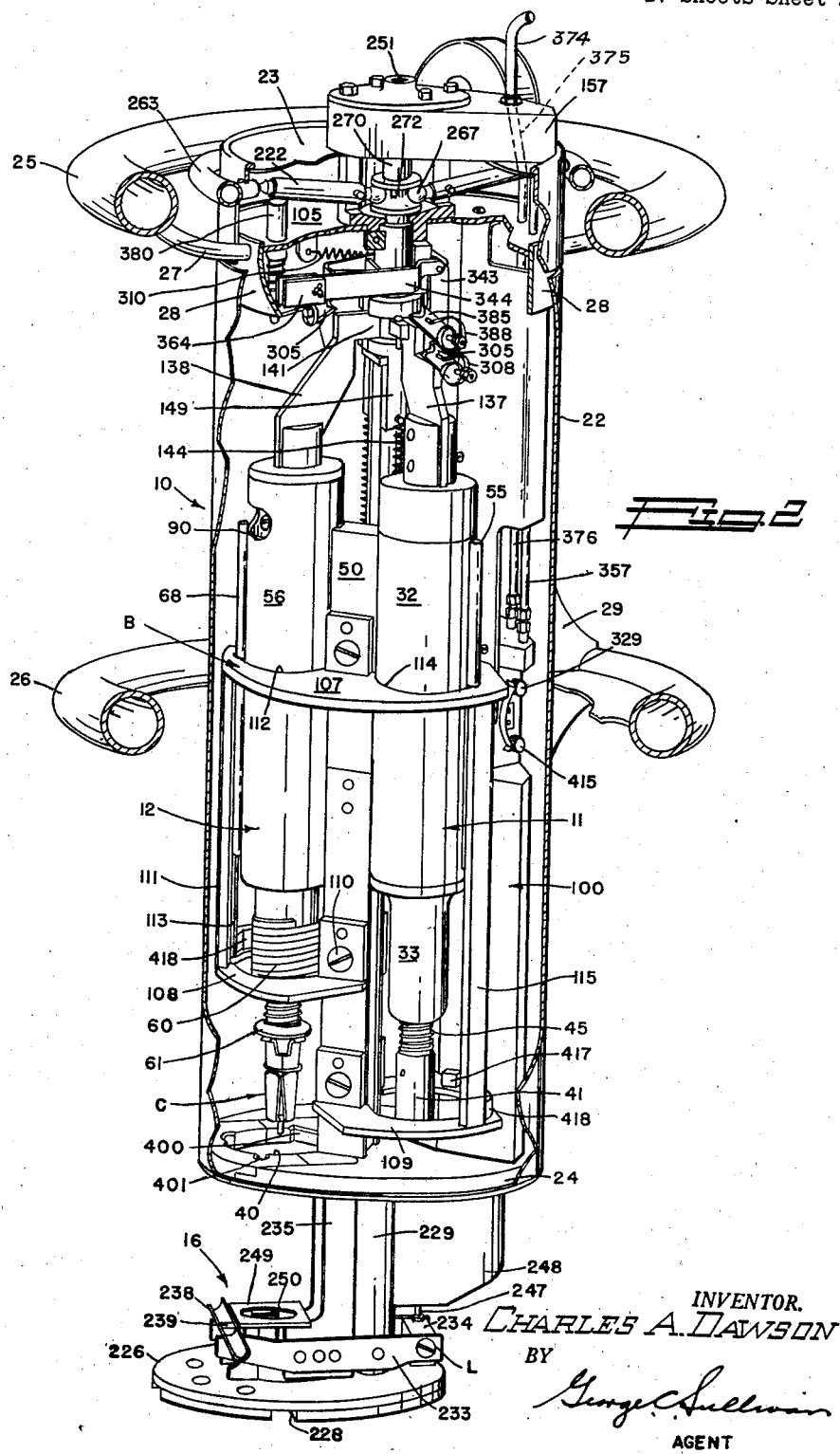
Figure 2 is a view similar to Figure 1 with the unit in another rotative position.

The drilling and riveting means 11 and 12 are supported by a carriage or frame B, which in turn, is rotatably mounted on the cylinder 95. This carriage B includes the above referred to bar 50 and longitudinally spaced plates 107, 108 and 109; see Figure 2. The plates are secured to the bar 50 by screws 110 and a guide and pressure member 111 extends between the intermediate plate 108 and the outer plate 107. The outer and intermediate plates 107 and 108 have aligned openings 112 for freely receiving the case 56 of the riveting means 12, and a groove 113 in the axial member 111 slidably receives the guide member 68. Thus the riveting means 12 is effectively guided for independent axial movement by the guide strip 66 cooperating with the bar 50, and the guide member 68 cooperating with the axial member 111. The inner and outer plates 107 and 109 have aligned openings 114 for freely receiving the case or body 32 of the drilling means 11. An axial member 115 extends between the plates 107 and 109. The member 115 has a groove for slidably receiving the guide member 55. The drilling means 11 is effectively guided by the strip 47 cooperating with the bar 50 and by the guide 55 slidably engaging with the axial member 115.

Means are provided for urging or forcing the members 111 and 115 against the guide members 68 and 55 respectively so that the strips 66 and 47 of the riveting and drilling means are held in effective sealing engagement with the walls of the grooves 67 and 49 of the bar 50. These means include blocks 417 secured to the plates 107, 108 and 109; see Figure 29. Levers 418 are pivoted to the plates 107, 108 and 109 and engage the guide members 68 and 55. Screws 419 are threaded through openings in the levers 418 and react against the blocks 417. Advancement of the screws 419 rotates the levers 418 so that the levers act against the members 68 and 55. This maintains the strips 66 and 47 in tight sliding engagement with the walls of the grooves 67 and 49 to prevent the leakage of air pressure at these points.

The frame or carriage B, made up of the plates 107, 108 and 109, the bar 50 and the members 111 and 115, is rotatable on the central cylinder 95. The outer plate 107 has an opening 116 receiving the collar 102 and the inner plate 109 has an opening 117 receiving the shaft member 97; see Figure 10. Nuts 118 are threaded on the collar 102 and a suitable anti-friction bearing 119 is arranged between the nuts and the outer plate 107. Nuts 120 are provided on the member 97 and an anti-friction bearing 121 is engaged between the nuts 120 and the plate 109. The plates 107 and 109 have shouldered engagement with their respective bearings 119 and 121 so that the bearings assume both lateral and axial loads to dependably support the carriage B for free rotation. From the above, it will be seen that the drilling means 11 and the riveting means 12 are free to shift axially independently of one another, and it will be observed that the assembly of the carriage B, and the means 11 and 12 is rotatable on the central cylinder 95 as a unit.

The means 13 further includes a cylinder and piston mechanism operable to alternately partially rotate the assembly of the carriage B and the drilling and riveting means 11 and 12 in opposite directions. This mechanism includes a pair of spaced parallel cylinder openings 122 in the stationary valve block 100; see Figure 29. Pistons 123 operate in the cylinders 122 and are exposed at the outer ends of the cylinders. A double armed lever 124 is pivotally secured to the valve block 100 by a pivot pin 125. The outer ends of the pistons 123 are slotted to receive the lever 124 and the lever carries pins 126 which cooperate with transverse slots 127 in the pistons. A link 128 is pivotally connected with one arm of the lever 124, and has its outer end pivotally attached to the intermediate plate 108 of the carriage B. It will be seen that upon outward actuation of one piston 123 the other piston is retracted and the carriage is rotated approximately 90° to move the drilling means 11 into axial alignment with the opening 40 in the inner end of the case 10. This brings the drilling means 11 into alignment with the selected point on the work assembly A. Upon outward actuation of the other piston 123, the carriage B is rotated about 90° in the other direction to bring the riveting means 12 into alignment with the opening previously drilled in the work assembly A by the drill D. The means for controlling the delivery of actuating air under pressure to the cylinders 122 will be hereafter described.

The means 13 further includes a cylinder and piston mechanism for producing selective or independent longitudinal movement of the drilling means 11 and riveting means 12. A suitable double ended piston 129 is operable in the central cylinder 95; see Figure 10. A piston rod 130 is secured to the piston 129 and extends outwardly through a packing gland 390 in the head 103 to project into the tube 104. A collar or block 131 is rigidly attached to the outer portion of the piston rod 130; see Figures 7 and 8. The block 131 is movable longitudinally in the tube 104. The tube 104 has a longitudinal slot 132, and the block 131 is provided with a lug 133 which extends into the slot. A sleeve 134 is shiftable axially on the exterior of the tube 104 and has a longitudinal slot 135 registering with a slot 132 and receiving the lug 133. The sleeve 134 is further provided with a circumferential slot 136 which intersects the axial slot 135. The drilling means 11 and the riveting means 12 carry parts which operate in the slot 136 and which cooperate with the lug 133. A blade 137 extends from the outer end of the drilling means body 32 and a similar blade 138 is secured to a plug 139 fixed in the outer end of the case 56 of the riveting means. The blade 137 has a lug 140 adapted to extend into the circumferential slot 136 and the blade 138 has a similar lug 141 also adapted to extend into the circumferential slot. The lugs 140 and 141 are freely movable in the slot 136 upon partial rotation of the carriage assembly.

Upon alternate rotation of the carriage in opposite directions as described above, the lugs 140 and 141 are alternately engaged with the lug 133 for the transmission of axial movement from the piston rod 130 to the drilling means 11 and riveting means 12. A notch 142 is provided in the outer edge of the lug 133 and is adapted to receive the lugs 140 and 141. Thus as seen in Figures 7 and 8 the lug 141 associated with the riveting means 12 is engaged in the notch 142 so that upon actuation of the piston 129 the riveting means 11 will be moved toward and through the opening 49 in the end of the case 10. Upon the return stroke of the piston 129, the lug 133 travels outwardly in the slot 132 to bring the lug 141 into alignment with the circumferential slot 136. Upon the subsequent operation of a piston 123, the carriage is partially rotated to disengage the lug 141 from the notch 142 and to bring the lug 140 into engagement with the notch. Accordingly, during the subsequent full stroke of the piston 129, the drilling means 12 is advanced to the work and then retracted from the work, restoring the lug 140 into alignment with the circumferential slot 136. The full sequence of operation of the means 11 and 12 and of the means 13 will be later described in detail.

The sleeve 134 is constantly urged downwardly to follow the lug 133 during the initial phase of movement of the lug toward the work. Springs 144 are engaged under tension between pins 145 on the sleeve 134 and ears 146 on the tube 104. The downward travel of the sleeve 134 is limited by engagement of the sleeve with a plate 147 fixed in the case 10. A transverse part 148 is provided on the lug 133 and is adapted to move through a broad window 149 provided in the wall of the sleeve 134; see Figure 6. Upon downward movement of the lug 133, the sleeve 134 travels with the lug until it is stopped by engagement with the plate 147. During the return movement of the lug 133 the transverse part 148 of the lug moves upwardly through the window 149 and engages the upper wall of the window to move the sleeve 134 back to its outermost position. It is to be observed that when either the drilling means 11 or riveting means 12 is fed toward the work, the other means 11 or 12 is also advanced toward the work for a short distance. The purpose of this limited advancement will later become apparent.

The rivet feed means 14 is adapted to contain a substantial number of rivets and is operable to feed or deliver the rivets to the selector means 15. The feed means 14 includes a track 150 for containing and directing a multiplicity of rivets; see Figures 4 and 40. The track 150 extends longitudinally along the exterior of the case shell 22 and is secured to a frame member 151 of the case. The outer end of the track 150 is adjacent the outer end of the case 10 while the inner end of the track leads to a block member 153 secured to the inner end wall 24. A longitudinal groove 152 of H-shaped cross section is provided in the track 150. The outer portion of the groove 152 has a channel 391 shaped and proportioned to receive the heads of the rivets, and the rivet shanks extend outwardly through the narrow portion of the groove to project from the track 150. The outer end of the groove 152 is flared to readily admit a supply of the rivets. The rivets are adapted to be stacked in the groove 152 so that the heads of the adjacent rivets are in engagement with one another. The block member 153 has a groove or track 154 joining the lower end of the groove 152 and curving inwardly in the general direction of the central axis of the case 10. The edge of the member 153 is correspondingly curved.

The means 14 further includes a spring urged mechanism for advancing the rivets along the track 150. A pulley 155 is supported on a shaft 156 projecting from a head or block 157 on the outer end wall 23 of the case 10. A similar pulley 158 is rotatably supported on a shaft 159 projecting from the above-mentioned valve block 100. An endless line or cable 160 operates over the pulleys 155 and 158, and passes through the inner portion of the groove 152 of the track 150. The line 160 is wrapped several times around the pulley 155. The pulley shaft 156 is fixed to the block 157 and the pulley 155 is screw threaded on the shaft. The threads of the pulley have the same lead as the convolutions of the line 163 on the pulley so that upon rotation of the pulley, the line remains in the correct position in relation to the track 150. Finger openings 427 in the pulley 155 allow for ready movement of the line 160 and follower 162 when replenishing the supply of rivets. A tension spring 161 may be connected in the cable 160 to maintain the cable under suitable tension. A follower 162 is secured to the cable 160 and operates in a broadened channel 392 of the track 150. The follower 162 has a reduced sloping or curved tongue 393 which is engageable with the heads of the rivets to urge the rivets along the track 150. The tongue 393 is broadened at its end to have effective engagement with the rivet heads when urged in the direction of the work assembly. The tongue is adapted to ratchet past the rivet heads when moved in the other direction.

Spring means is provided for applying torque to the pulley 155 for the purpose of actuating the cable 160 and advancing the follower 162. This spring actuated means includes a line or cable 163 having one end anchored to the block 157 and having its other end wrapped about and secured to a hub 394 on the pulley 155; see Figure 39. A traveling pulley 164 engages the cable 163 between its point of attachment to the block 157 and pulley 155; see Figure 38. The traveling pulley 164 is rotatably supported in a yoke 165. A spring 166 is connected under tension between the yoke 165 and a post 167 on the valve block 100. It will be seen that the spring 166 acting through the medium of the pulley 164 and cable 163 constantly applies torque to the pulley 155 so that the tongue 393 of the follower 162 is constantly urged against the rivets to feed them along the track 150. The track 150 and the groove 154 of the block member 153 are adapted to contain a substantial number of rivets to provide for a considerable number of successive riveting operations before the rivet supply requires replenishing.

The means 15 is operable to select an individual rivet from the rivet supply just described and introduce it to the riveting means 12 during each cycle of operation. The means 15 includes a chuck C associated with the riveting means 12 to grip the individual rivets and hold them in position on the rivet set 59. The set 59 is designed to carry the chuck C. The usual depression 168, shaped to conform to the rivet head, is provided in the end of the set 59; see Figure 17. The exterior of the rivet set slopes away from the depressed end and is then cylindrical for some distance. The cylindrical portion terminates at an annular groove 170, and a second annular groove 171 with sloping walls is spaced outwardly from the groove 170. A movable washer or sleeve 172 is provided on the shank of the set 59 adjacent the groove 171.

The chuck C includes a set of jaws 173 assembled around the set 59 and retained thereon by a spring ring 174. The spring ring 174 engages in external grooves in the jaws 173. The inner surfaces of the jaws 173 are shaped to conform generally to the rivet set 59. Inturned lips 175 are provided on the ends of the jaws 173 to engage under the head of a rivet to releasably hold the rivet head in the depression 168. Internal lugs 176 are provided on the jaws 173 and are adapted to engage in the groove 170. Arms 177 extend from the outer ends of the jaws 173 and terminate in fingers 178. The arms 177 flare outwardly, and the fingers 178 have convex rounded surfaces for bearing on the sleeve 172. A spring 426 urges the sleeve 172 against the fingers 178 of the chuck jaws. When the chuck C is in the open condition, the lips 175 are engaged on the sloping outer portion of the set 59 and the lugs 176 are in the groove 171. When the jaws 173 are forced outwardly along the set 59 in the manner to be hereinafter described, the lugs 176 move into the groove 170 and the lips 175 swing together under the head of the rivet to releasably hold the rivet at the end of the set. Outward pressure applied to the fingers 178 swings the jaws 173 to their open positions permitting the set 59 to drive the rivet. The detailed operation of the chuck C will be later described.

The rivet selecting means 15 further includes a stop or locating block 180 having a notch 181 in one corner to receive the head of a rivet; see Figures 32, 33 and 34. The axis of the riveting means 12 is aligned with the axis of the notch 181 when the riveting means is in its fully retracted rotative position seen in Figure 31. The selecting means serves to select or advance a rivet from the track 154 of the member 153 and engages it in the locating notch 181 so that the rivet may be pushed into the chuck C of the riveting means 12. The mechanism for selecting the rivets includes a lever 182 pivoted on the end plate 124 by a pivot pin 183. The lever 182 is adapted to extend in side by side relation to the member 153, and is urged toward this position by a torsional spring 184 reacting between the lever and the valve block 100. The forward portion of the member 153 is cut out, and a lateral arm 185 on the lever 182 is adapted to move into the cut out portion of the member. A finger 395 extends from the member 153 at one side of the track and presents a pitched end. The arm 185 is adapted to move back and forth across the end portion of the track 154 and is provided with cam parts to constitute a gate for individually passing rivets from the track 154 to the locator notch 181.

Two spaced cam projections 186 and 187 are provided on the arm 185 to engage with the rivets. The projection 186 presents a pitched surface 188 and the projection 187 presents an edge 189 defined by two pitched divergent surfaces 190 and 191. The surfaces 188 and 191 are spaced apart and are substantially parallel. The channel between the surfaces 188 and 191 is adapted to slidably receive the shank of a rivet. The parts are related so that when the lever 182 swings away from the member 153 the surface 188 engages the endmost rivet in the track 154 and moves this rivet outwardly through the track. The rivet is held against bodily lateral movement because of its engagement in the track 154 and the cam surfaces 188 and 191 serve to shift the rivet outwardly along the track to the position shown in Figure 33. Upon movement of the lever 182 toward the member 153, the point 189 of the cam projection 187 engages the shank of the partially advanced rivet at a point offset from its center, and the rivet is moved into the locator notch 181 by the pitched surface 190. Thus when the lever 182 reaches its position in substantially parallel relation to the member 153, the rivet has been advanced to the locator notch 181. It will be seen that with each oscillation or full stroke of the lever 182 a single rivet is advanced from the track 154 to the locator notch 181. The construction is such that there is no possibility of the rivet heads riding one over the other to cause the rivets to jam at the end of the track 154. When the machine is first put into operation, it is necessary to prime it by causing one complete operation of the lever 182 to advance a rivet to the locator notch 181 for engagement by the chuck C of the riveting means 12.

The invention may include means for retaining the rivet in the track at the locator notch 181 in the event the machine is inverted or tipped. A cover plate 192 is provided on the member 153 and extends over the track 154. The plate 192 terminates a short distance from the end of the member 153. A slot 193 is provided in the locator block 180, and a dog 194 is pivoted in the slot. A spring 195 is engaged between the block 181 and the dog 194 to urge the dog outwardly. When the lever 182 is in its outer position shown in Figure 33, the dog 194 is projected by its spring 195 to engage the shank of the outermost rivet and hold the rivet in the track 154 where its head is engaged with the finger 395 and partially engaged under the cover plate 192. This prevents loss or displacement of the rivet. A projection 196 is provided on the outer end of the lever 182 and serves to retract the dog 194 when the lever moves toward the member 153. This retraction of the dog 194 leaves the rivet at the locator notch 181 free for advancement into the chuck C. Figure 34 shows the dog in the retracted position. It is to be understood that when the rivet is at the locator notch 181, its head is clear of the cover plate 192 and finger 395 so that the rivet may be advanced toward the chuck C of the riveting means.

The means for operating the lever 182 between the positions illustrated in Figures 33 and 34, includes a bell crank 197 pivoted on a bracket 396 secured to the side of the valve block 100. A rod 198 is connected with one arm of the bell crank 197 and extends outwardly through an opening of the end plate 24; see Figure 37. A tension spring 199 is connected between the rod 198 and a clamp foot lever L which will be later described. The clamp lever L is rotated or pivoted and the spring 199 and rod 198 transmit this movement to the bell crank 197. The second arm of the ball crank 197 extends into a slot 201 in the lever 182 and a spherical head 202 on the bell crank arm cooperates with the slot. When the bell crank 197 is rotated, the lever 182 is rotated or swung between its two positions illustrated in Figures 33 and 34.

The rivet selecting and feed means 15 further includes a feed foot 203 for moving the rivet from the locator notch 181 toward the chuck C as the riveting means 12 moves toward the head plate 24 during the first portion of movement of the drilling means 11 toward the work. The feed foot 203 is attached to a rod 204 which is guided for axial movement in an opening 205 in the plate 24. The foot 203 is angular and is shaped to extend around the forward end of the member 153 as shown in Figures 32 to 34. The foot 203 terminates at a surface 205 which is aligned with and opposes the shank of the rivet positioned at the locator notch 181. The rod 204 carries a block 206 which is slotted to receive a lever 207; see Figure 35. A transverse shaft 208 offset from the rod 204 mounts the lever 207 in the block 206 for pivotal movement. A yoke 209 is provided on the inner end of the lever 207 and is adapted to straddle the shank of the rivet set 59 and cooperate with the sleeve 172 when the riveting means 12 is in its retracted rotative position. Figures 31 and 35 show the yoke 209 in cooperation with the sleeve 172. The outer end of the lever 207 is split or yoked to receive a link 210. The link 210 is slotted and connected with the lever 207 by a pivot pin 211 which passes through its slot. The link 210 extends outwardly to the outer end of the valve block 100. A tension spring 212 is connected between the link 210 and the end plate 24 and a similar spring 213 is connected between a bracket on the cover plate 192 and the inner arm of the lever 207. It will be observed that the springs 212 and 213 are offset outwardly from the axis of movement of the lever 207 to both urge the outer end of the lever toward the end plate 24.

Pneumatic means is provided for operating the feed foot 203 and the lever 207. A split or yoked lever 214 is pivotally connected with the outer end of the link 210 and its yoked end embraces the rod 204 to cooperate with a block 215 fixed to the rod; see Figure 35. A cylinder opening 216 is formed in the outer end of the valve block 100 and a piston 217 operates in the cylinder opening. A pivot pin 218 connects the outer end of the piston 217 with the lever 214. Air under pressure is admitted to the inner end of the cylinder opening 216 when the drilling means 11 reaches its operative rotative position with the riveting means 12 in its retracted rotative position. The initial outward movement of the piston 217 causes the lever 214 to pivot on the pin 218. The springs 212 and 213 resist outward bodily movement of the lever 214, and during the initial operation of the piston 217 the lever 214 pivots or rotates about the pivot pin 219. The lever 214 cooperating with the block 215 transmits movement to the rod 204 to produce outward movement of the rod and the foot 203 attached thereto. The moving foot 203 acts on the rivet in the chuck C after the riveting means has moved a short distance toward the foot 203 during the initial phase of movement of the drilling means 11 toward the work A as above described. The limited movement of the riveting means 12 toward the work brings the open chuck C into receiving relation to the rivet at the locator notch and brings the set 59 against the rivet. When the foot 203 moves outwardly with respect to the work, this movement is transmitted to the riveting means 12 to return the same to its original idle position. When the riveting means 12 has been moved outwardly to its original idle position, the continued outward movement of the piston 217 overcomes the resistance of the springs 212 and 213 and the lever 214 is caused to pivot about the axis of engagement of its yoke with the block 215. This movement of the lever 214 moves the link 210 outwardly and rotates the lever 207. The yoke 209 of the lever 207 presses the sleeve 172 along the rivet set to close the chuck jaws 173 about the rivet. A stop screw 421 is provided on the link 210 and is engageable with a shoulder 422 on the block 100 to limit the outward movement of the link and piston 217. From the above it will be seen that the movement of the piston 217 results in introduction of the located rivet into the chuck C and closes the chuck C on to the rivet.

The above mentioned rod 204 continues outwardly through an opening in the plate 105 and its outer end is adapted to engage with an arm 221 on a valve operating lever 222; see Figure 1. The lever 222 forms part of the operating mechanism for the main air pressure supply or control valve 223 of the tool. The rod 204 acting outwardly on the arm 221, is adapted to operate the lever 222 to close the valve 223. In the event there is no rivet at the locator notch 181 when the piston 217 is actuated, the rod 204 moves outwardly to move the lever 222 and close the main valve 223. This cannot occur when a rivet is properly positioned at the locator notch 181. Thus the rod 204 forms a safety means for terminating operation of the machine when there is no rivet at the locator notch 181 by reason of malfunctioning of the rivet selecting means 15, or because the supply of rivets has become exhausted. A spring 224 surrounds the rod 204 and is engaged under compression between the plate 105 and a collar 225 on the rod to yieldingly urge the rod to a position clear of the arm 221 and to normally hold the foot 203 in its idle position. The details of the valve 223 and the mechanism for operating the same, will be later described.

The clamp mechanism 16 is operable to clamp or hold the tool in the operative position at the work assembly A throughout the series of drilling, rivet inserting and rivet driving operations. The mechanism 16 includes what I will term a foot 226; see Figures 1, 2 and 31. The foot 226 is spaced forwardly from the end plate 24 of the case 10 and is preferably a disc-like member supported in generally parallel relation to the end plate. Pads 227 of suitable non-scratching material are provided on the active face of the foot 226 to engage the work sheets. The pads 227 are shaped and related to leave intersecting grooves 228 that are adapted to receive the rows of rivet heads on the sheet assembly A. The grooves 228 intersect at a point aligned with the axis of the opening 40 in the end plate 24. The foot 226 is fixed to a tube 229 which in turn is secured to the end portion of the member 97. The foot 226 is secured to the tube 229 in eccentric relation thereto as shown in Figures 32 and 36, and has an opening 230 aligned with the opening 40 for receiving the drill D and the rivet set 59 when the same are actuated. The eccentricity of the foot 226 and its opening 230 allow the tool to be employed to install rivets in close relation to the spaced elements 231 of the frame or jig with which the work sheets A are associated. Figure 41 illustrates the manner in which the tool may be used with a jig. This jig includes an outer frame made up of the elements 231 arranged in intersecting relation and spaced forwardly from the work A. The frame elements 231 are provided at their inner edges with a series of spaced notches 232.

The clamp mechanism 16 further includes a clamp lever L for cooperating with the jig elements 231. The lever L is made up of spaced parallel side members 233 and one or more transverse connecting members 234. A pair of spaced angular supports 235 is welded or otherwise secured to the tube 229, and the side members 233 of the lever L straddle the tube 229 and pass along the outer sides of the supports 235. Sets of spaced transverse openings 236 are provided in the lever members 233 and the supports 235. A pin or shaft 237 is arranged in a selected set of aligned openings 236 to pivotally mount the lever L on the supports 235. The stroke of the lever L may be regulated by arranging the shaft 237 in selected aligned sets of openings 236. An arm of the lever L carries a channel 238 which faces the end of the case 10. The channel 238 is shaped to receive the edge portion of any one of the frame elements 231. A lug 239 is provided in the channel 238 midway between its ends. The lug 239 is adapted to cooperate with a selected notch 232 of a frame element 231 to definitely locate the tool relative to the work assembly A. Following each riveting operation the tool may be advanced to engage the lug 239 in the next adjacent notch 232 to locate the tool for the succeeding operation. In this manner the tool may be employed to install a row of spaced rivets in the work assembly A.

The clamping mechanism 16 further includes pneumatic means for operating the lever L to clamp the tool on the work assembly A and work jig. This means includes a piston 240 operable in the tube 229 and equipped with a suitable cup-leather for slidably sealing with the internal surface of the tube. A rod or pin 242 is secured to the piston 240 and extends outwardly through axial slots 243 in the wall of the tube 229. The opposite ends of the pin 242 are engaged in openings 244 in the lever members 233 to connect the lever with the piston 240. When air under pressure is admitted to the member 97 and tube 29 the piston 241 is forced outwardly to pivot the lever L. Assuming that the channel 238 is engaged with a jig element 231, the operation of the lever L by the piston 240 results in the firm engagement of the foot 226 with the sheet assembly A. It will be seen how the lever L, reacting against the jig element 231, forcibly and positively clamps the foot 226 against the work. Spring means is provided for restoring the lever L and piston 240 to their idle positions following operation. A socket 245 is formed in the transverse lever member 234 and contains a compression spring 246. The spring 246 is engaged under compression between the end wall of the socket 245 and the foot 226 to swing the lever L to its idle position when the air pressure is relieved from the piston 241. The above referred to spring 199 associated with the bell crank 197 is anchored at its lower end to a hook 247 on the lever L. Thus with each movement of the clamping lever L, the bell crank 197 of the rivet feed means 14 is operated. A housing 248 may extend from the end plate 124 to house and protect the spring 199, tube 229 and adjacent parts.

The supporting members 235 of the means 16 are spaced apart and shaped to permit the drill D and rivet set 59 to pass between them when the drilling means and riveting means are advanced to the work assembly A. Means is associated with the supporting members 235 to open the chuck C and free it from the rivet when the rivet is introduced into the opening formed by the drill D. This means comprises a plate 249 secured to the angular lower portions of the support members 235. The plate 249 has an opening 250 in concentric relation with the axis of the opening 40 and proportioned to freely receive the pressure sleeve 41 of the drilling means 11 and to receive the contracted jaws 173 of the chuck C. However, when the riveter 11 has been advanced a sufficient distance to introduce the rivet into the drilled opening in the work assembly A, the fingers 178 of the chuck C engage the plate 249, and the final advancement of the riveting means is accompanied by opening of the jaws 173 as a result of the engagement of the arms 177 and fingers 178 with the plate 249. The fingers 178 engaged with the plate 249 hold the jaws 173 against further advancement, and the set 59 moves through the jaws bringing the groove 171 in receiving relation to the lugs 176 and retracting the sleeve 172 along the shank of the set.

The opening 40 is preferably shaped to locate and guide the drilling means 11 and riveting means 12 when they are moved toward the work. Flat walled notches 400 and partially cylindrical notches 401 are provided in the wall of the opening 40. The notches 400 are adapted to slidably receive the strips 47 and 66, and the notches 401 are adapted to slidably receive the guides 55 and 68 of the means 11 and 12. The inner ends of the notches or grooves 400 and 401 are beveled to aid in locating and guiding the means 11 and 12 as they enter the opening 40.

The foregoing portion of the specification comprises a detailed description of the principal operating elements of the portable riveting machine, but does not include a description of the fluid pressure system, valves, controls, etc., for energizing and controlling the various principle elements. I will now proceed with a description of the fluid pressure actuating system, the controls, and the like.

In accordance with the invention, the portable unit is fully automatic and power actuated, and may be designed for operation by any selected fluid pressure medium. I have herein referred to the device as operated by pneumatic pressure, air under pressure being a preferred operating medium in a portable manually controlled tool. It is a feature of the invention that a single air pressure supply is all that is required for the full actuation of the tool. Thus in Figures 3 and 41 I have shown a single air pressure line 251 leading to the portable tool. The line 251 is preferably flexible to facilitate manipulation of the portable tool unit. The air supply line 251 connects with an opening 252 in the block 157 on the outer plate 23. The line 251 may be secured to a plate 253 secured on the block 157, and ports 254 lead from the opening 252 to a space or chamber 255 which in turn communicates with the line 251. A main air pressure port 256 communicates with the opening 252 at a point spaced from the supply ports 254 and extends laterally through the block 157 to communicate with a pipe or tube 257 which extends axially into the case 10. A bleed port 260 in the block 157 communicates with the opening 252 at a point spaced inwardly of the port 256 and leads outwardly to the atmosphere. The above referred to valve 223 operates in the opening 252 to control the delivery of air pressure to the port 256 and pipe 257. The main control valve 223 includes a sleeve 258 entering the opening 252 from its inner end and provided with spaced valve parts 259 and 261. The valve 223 is movable between the "closed" position illustrated in Figure 5 where the part 261 closes the ports 254 to close off communication between the supply line 251 and the port 256 and an "open" position where the port 256 is in communication with the supply line 251. When the valve 223 is in its "closed" position the valve part 259 is spaced from the port 260 so that the port 256 is in communication with the port 257 to allow pressure to bleed from the various instrumentalities of the tool. When the valve 223 is in its "open" position the head or part 259 closes the port 260 to close off communication between the bleed port 260 and the port 256 and the air pressure is prevented from escaping through the bleed port. A plug 410 separates the outer end of the opening 252 from the chamber 255. A bleed port 411 in the block 157 connects the outer portion of the opening 252 with the atmosphere so that both ends of the valve 223 are exposed to atmospheric pressure and the valve is balanced.

The invention provides simple effective means for operating the main supply valve 223. The valve operating means is such that the operator need only impart movement to an operating handle to move the valve 223 to either the open or the closed position, whereupon the valve remains in the selected position. The means for operating the valve 223 includes the handle ring 263 surrounding the outer portion of the case shell 22, and disposed within the ring 25 to be protected thereby. Radial stems or blocks 264 are secured to the interior of the ring 263 and extend inwardly through axial slots 265 in the shell 22. A lever 222 is operatively associated with each block 264. Stems 266 are set in openings in the inner ends of the levers 222 and have spherical heads 267. Pivot shafts 268 pass through transverse openings in the levers 222 and stems 266 to secure the stems to the levers. The end parts of the shafts 268 are received in openings in the slotted cage 269, which is secured between the plate 105 and the block 157. The levers 222 are pivotally supported on the shafts 268 so that the stems 266 form the short inner arms of the levers. A collar 270 engages around the sleeve 258 of the valve 223 and is secured thereto by a screw 271. An annular groove 272 in the collar 270 receives the spherical heads 267 to operatively connect the levers 222 with the valve 223. The outer portions of the levers 222 have longitudinal openings 273 which slidably receive pins 274. The pins 274 extend from the ends of the levers 222 and have points 275 which bear in tapered sockets 276 in the blocks 264 of the handle ring 263. Springs 277 are arranged under compression between the end walls of the openings 273 and the ends of the pins 274, and urge the pins outwardly so that their points 275 bear in the sockets 276 at all times.

It will be seen that when the ring 263 is manually moved toward the work assembly A from the position illustrated in Figure 5, the heads 267 cooperate with the groove 272 to move the valve 223 to its open position. During the first phase of this movement, the springs 277 are compressed because the pins 274 are moved through an arcuate path and are confined against outward movement because of engagement of their points 275 in the sockets 276. When the center of movement has been passed, the springs 277 expand to move the pins 274 outwardly, thus maintaining the points 275 in their sockets 276. The springs 277 acting on the pins 274, hold the lever assemblies under compression in their over-center positions, and the operating ring 263 and the valve 223 remain in position until the ring 263 is again manually operated, or until an automatic element of the tool acts on a lever 222 to reverse the valve 223. The same action takes place when the ring 263 is moved outwardly to shift the valve 223 to its closed position. The ring 263 allows ready manual operation of the valve 223 from any point around the circumference of the case 10. When the feed foot 203 suddenly moves outwardly as above described, it cooperates with a lever 222 to move the valve 223 to its closed position. The valve operating means is also acted on by an automatic operation terminating means as will be later described.

The fluid pressure actuating system includes the manifold valve 17 for controlling the delivery of actuating fluid pressure to the drilling means 11, the riveting means 12, and the rivet feed cylinder 216. The valve 17 is operated by the oscillation or partial rotation of the carriage B supporting the drilling means 11 and the riveting means 12. The valve 17 comprises two disc-like valve members 278 and 279 surrounding the central member 97 above the end plate 24; see Figure 10. The member 278 is secured to the bar 50 and plate 109 to turn with the carriage B. The member 279 has a finished surface 280 bearing on a raised finished face 281 of the end plate 24. A corrugated or waved spring 282 is engaged between the opposing surfaces of the valve members 278 and 279 to maintain the surface 280 of the member 279 in effective engagement with the face 281. The main air pipe 257 communicates with an axial port or passage 283 in the valve block 100 and this passage extends to a port 284 in the end plate 24. The pressure port 284 terminates at the valve face 281.

The manifold valve 17 controls delivery of air under pressure from the port 284 to the drilling means 11 and riveting means 12. The valve member 278 has a circumferentially extending internal opening 285 terminating in one end at a lateral port 286. The port 286 extends through the wall of the member 278 and its outer end communicates with the port or passage 69 of the bar 50. As above described, the passage 69 leads to the port 70 which supplies air under pressure to the riveting means 12. A tube 287 extends through axial openings in the valve members 278 and 279, and assists in connecting the member 279 with the member 278 for simultaneous rotation therewith. One end of the tube 287 is in communication with the passage 285 of the member 278 while the other end of the tube is located at the surface 280 of the member 279. The parts are related so that when the riveting means 12 is in its operative rotative position the tube 287 is in communication with the port 284 in the plate 24 and actuating air pressure is free to pass through the tube 287 to the circumferential passage 285 and then through the passage to the port 286 which delivers it to the passage 69 of the bar 50 to be conducted thereby to the riveter supply port 70.

The valve member 279 has a circumferential groove 288 in its active face 280. The mouth of the groove 288 is closed by the face 281 of the plate 24. A tube 289 is arranged in axial openings in the member 278 and 279 and has one end in communication with an end of the groove 288. The other end of the tube 289 is notched to communicate with a radial port 290 in the valve member 278; see Figure 44. The radial port 290 extends outwardly through the wall of the member 278 to have communication with the passage 51 in the bar 50. As above described, the passage 51 supplies the actuating air pressure to the port 48 in the body 32 of the drilling means 11. When the drilling means 11 is in the operative rotative position, the groove 288 has communication with the air pressure supply port 284. Thus the actuating air under pressure is free to pass from the supply port 284 through the groove 288 and thence through the tube 287 to the radial port 290 and flows through the passage 51 to the drilling means 11. With the drilling means 11 in its operative rotative position, the tube 287 is out of communication with the pressure supply port 284 and no air under pressure is supplied to the riveting means 12. In a like manner when the riveting means 12 is in its operative rotative position the groove 288 is out of communication with the pressure supply port 284 and no air under pressure is supplied to the drilling means 11. From the above description of the manifold valve 17 it will be seen that oscillation or rotation of the carriage automatically controls delivery of the actuating air pressure to the drilling means 11 and riveting means 12, the pressure being supplied to these mechanisms only when they are in their respective operative rotative positions in alignment with the opening 40.

The manifold valve 17 also serves as one means for controlling the delivery of actuating air pressure to the rivet feed cylinder 216, the reciprocating valve 18 being the other means for controlling the delivery of air pressure to the cylinder. A passage 292 extends through the plate 24 and valve block 100 to the reciprocating valve 18. The outer end of the passage 292 occurs at the face 281 of the plate 24 and is circumferentially spaced from the air pressure supply port 284. When the drilling means 11 is in the operative rotative position, that is when the valve 17 is in the position illustrated in Figure 45, the groove 288 is in communication with the two spaced ports 284 and 292 so that air pressure from the port 284 may flow into the passage 292 to pass to the reciprocating valve. When the riveting means 12 is in the operative rotative position, the groove 288 is out of communication with both the port 284 and the passage 292 and no actuating air under pressure is supplied to the passage.

The air pressure supply port 284 extends through the wall of the member 97 to supply air pressure to the cylinder tube 229. Immediately upon opening of the valve 223 air under pressure is supplied directly to the member 97 and cylinder tube 229 to operate the piston 240 of the means 16. The air pressure remains applied to the piston 240 to maintain the means 16 in the actuated condition throughout the entire series of operations of the tool. The air under pressure continues to act on the piston 240 until the main valve 223 is closed, whereupon the actuating air pressure can bleed out through the bleed port 260.

The reciprocating valve 18 serves to control the delivery of actuating air under pressure to the axial feed cylinder 95 of the means 13 and assists in controlling the delivery of actuating air under pressure to the rivet feed cylinder 216. The valve 18 operates in an opening 295 which enters the outer end of the valve block 100; see Figures 21 and 22. In accordance with the invention, the valve 18 is controlled by the rotary movement of the carriage B, and the axial movement of the means 11 and 12. A rod 296 extends outwardly from the valve 18, and its outer end is pivotally connected with a lever 297; see Figure 1. The lever 297 is pivotally supported between its ends on a bracket 298 on the central tube 104. The lever 297 continues beyond the tube 104 and its outer end is engageable by screws 299 which move with the drilling means 11 and the riveting means 12. Blocks are secured to the blades 137 and 138, and carry the screws 299 in positions to engage the lever 297 when the drilling means and the riveting means are advanced toward the work when in their operative rotative positions; see Figures 6 and 7. The screws 299 are adjustable to time the operation of the lever 297 and valve 18. Upon movement of either the drilling means 11 or the riveting means 12 toward the work, when in the operative rotative position, a screw 299 cooperates with the lever 297 to partially rotate the lever and thus move the valve 18 outwardly.

The valve 18 is operated inwardly in its opening 295 each time the carriage rotates. The means for operating the valve 18 further includes a link 300 pivotally connected with the lever 297 and extending outwardly in the case 10. The outer end of the link 300 is operatively connected with a lever 301, which in turn is pivotally supported on a pivot shaft 302; see Figure 5. The shaft 302 is carried by a block 303 suitably secured to the plate 105. The lever 301 extends transversely in the case 10 and is provided at its outer end with a projecting pin 304. The pin 304 is provided to cooperate with ratchet dogs or arms 305 carried by the drilling means 11 and the riveting means 12. The arms 305 are rotatably supported by pins 306 stationarily secured to brackets 307 on the blades 137 and 138; see Figures 13 and 17. Torsional springs 308 are anchored to the shafts 306 and are connected with the arms 305 to yieldingly urge the arms to their operative positions for engagement by the pin 304 of the lever 301. The arms 305 are normally in inclined or sloping positions such as illustrated in Figures 13 and 17.

When the carriage rotates to bring the drilling means 11 to its operative rotative position, the arm 305 associated with the drilling means engages the pin 304 and this engagement coupled with the rotative movement of the drilling means causes the arm to swing to the axial position. This movement of the arm 305 causes swinging of the lever 301. The movement of the lever 301 is transmitted to the valve 18 by the link 300 and lever 297 so that the valve is moved outwardly. A similar action takes place when the riveting means is rotated to its operative position, at which time the arm 305, associated with the riveting means, cooperates with the pin 304 of the lever 301 to produce rotation of the lever and outward movement of the valve 18. Notches 309 are formed in the outer ends of the arms 305 to assure correct engagement of the pin 304 with the arms. The spring urged arms 305 are positioned and related so that each arm is operative upon rotation of the carriage 11 in one direction, and to merely ratchet past the pin 304 when the carriage is rotated in the opposite direction.

A diagonally disposed spring 310 is connected under tension between a lug 311 on the plate 105 and a post 312 on the lever 301; see Figure 5. When the lever 301 is operated by an arm 305 as above described, the tension spring 310 is moved over the axis of rotation of the lever and serves to maintain the lever in the operated position. When the lever 301 is restored upon actuation of lever 297 by a screw 299, the spring 310 again throws over center to retain the lever, and the parts associated therewith, in the restored position. From the above it will be seen that the reciprocating valve 18 is controlled or operated both by the rotary motion of the carriage B, as well as axial motion of the drilling means 11 and the riveting means 12.

The reciprocating valve 18 controls the delivery of actuating air pressure to the axial feed cylinder 95. The valve 18 is an elongate element which slides in the opening 295 of the valve block 100. Three longitudinally spaced annular grooves 313, 314 and 315 are provided in the valve 18. A port 316 leads through the valve block 100 and the wall of the cylinder 95. One end of the port 316 communicates with the outer end of the cylinder 95 and the other end of the port communicates with the valve opening 295. The valve block 100 has a port 317 leading from the main air supply port 283 to the valve opening 295. The ports 316 and 317 are positioned and related so that the groove 313 of the valve 18 connects the ends of the two ports when the valve is in the inner position illustrated in Figure 21. Accordingly, when the valve 18 is moved to its inner position, actuating air under pressure is supplied to the outer end of the cylinder 95 to drive the piston 129 toward the work assembly A.

The invention provides for the regulable discharge of air from the inner end of the cylinder 95 during advancement of the piston 129 toward the work so that the speed of such advancement may be governed. A port 318 extends through the valve block 100 and the wall of the cylinder 95 and has one end in communication with the inner end of the cylinder; see Figure 23. A manually adjustable exhaust valve 319 is provided on the block 100 to control the rate of discharge from the port 318 as the piston 129 moves through the cylinder 95 toward the work assembly A. It will be seen that by controlling the rate of exhaust from the inner end of the cylinder 95 the speed of advancement of the drilling means 11 and the riveting means 12 may be readily controlled.

The means for supplying actuating air pressure to the cylinder 95 to move the piston 129 outwardly includes a port 320 joining the port 318 adjacent the cylinder 95 and extending diagonally through the block 100. The port 320 continues through a transverse plug 321 arranged in an opening which joins the inner end of the opening 295. The portion of the port 320 in the plug 321 is of reduced capacity and terminates at a concaved seat 322 exposed at the inner end of the valve opening 295. A stem 323 on the valve 18 extends into the reduced inner portion of the opening 295 with clearance and is provided at its lower end with a spherical head 324. The opening 295 is enlarged in diameter for some distance so that the valve 18 does not cut off communication between the port 325 and the reduced inner portion of the opening. The head 324 is adapted to cooperate with the seat 322 when the valve 18 is in its inner position to close the port 320. This occurs when the piston 129 is moved toward the work assembly A. A port 325 is formed in the valve block 100 to communicate with the inner portion of the valve opening 295 and thus have communication with the port 320 when the valve 18 is in its outer position. The port 325 extends through the block 100 and its outer end communicates with the valve opening 295 at a point adjacent the main air supply port 317. When the valve 18 is in its outer position shown in Figure 22, the groove 313 connects the air supply port 317 and the port 325 so that the actuating air under pressure is delivered to the inner end of the cylinder 95 to drive the piston 129 outwardly. When the reciprocating valve 18 is in its inner position shown in Figure 21, the exhaust of air from the inner end of the cylinder 95 is governed solely by the exhaust valve 319. It will be observed that when the valve 18 is in this inner position, the port 320 is sealed off by the head 324 engaged on the seat 322. Accordingly, when the piston 129 is at the end of its forward stroke there is very little air trapped or retained in the system. The reciprocating valve 18 is unbalanced by reason of the air under pressure acting on the shoulder 326 which is located where the reduced stem 323 joins the body of the valve. The invention includes a spring 327 connected under tension between the valve block 100 and the lever 301 to bias the valve 18 inwardly and thus overcome the tendency of the air pressure acting on the shoulder 326 to move the valve outwardly.

The invention includes means for regulating the speed of outward travel of the piston 129. A port 328 is provided in the valve block 100 and extends from the valve opening 295 to a regulable exhaust valve 329. When the valve 18 is in the outer position illustrated in Figure 22, the groove 314 connects the cylinder port 316 with the valved exhaust port 328 so that the discharge of air from the outer end of the cylinder 95 is under control of the valve 329. The valve 329 may be a suitable screw-threaded needle valve. It will be seen that the reciprocating valve 18 causes the axial travel of the piston 129 and that the rate of travel of the piston is controlled and readily regulated by the valves 319 and 329.

The reciprocating valve 18 also controls the delivery of actuating air under pressure to the rivet feed cylinder 216. A port 330 is provided in the block 100 and extends from the valve opening 295 to the inner end of the cylinder 216. When the valve 18 is in its inner position shown in Figure 21, the groove 315 connects the above referred to port 292 with the port 330 so that actuating air under pressure from the manifold valve 17 is supplied to the cylinder 216 to drive the piston 217 outwardly. A regulable valve 415 is provided to control the port 292. The valve 415 serves to restrict the delivery of air pressure to the cylinder 216 and thus delay the operation of the piston 217. This delay in the operation of the piston 217 allows the rivet set 59 to move into engaging relation to the rivet at the feed foot 203 before the piston 217 begins to move the foot. An exhaust port 331 is formed in the valve block 100 and extends from the opening 295 to the atmosphere. When the valve 18 is in its outer position shown in Figure 22, the groove 315 connects the cylinder port 330 with the exhaust port 331 to allow the air to exhaust from the cylinder 216. From the above, it will be seen that the reciprocating valve serves to time the supply and exhaust of air to and from the rivet feed cylinder 216.

The selector valve 19 determines or selects the direction of rotation of the carriage and governs the delivery of actuating air pressure to the bucking bars 20. The selector valve 19 is associated with the valve block 100 being arranged against a flat ground surface 332 on a side of the block; see Figures 27 and 28. The valve 19 is a disc-like member provided with a finished surface 333 for bearing on the face 332. Means is provided for supporting the valve 19 for rotation between two operative positions. A shaft 334 in the form of a stud or screw is threaded into a central opening in the valve 19 and is rotatable in a transverse opening 335 in the block 100. The shaft 334 carries the valve 19 for rotation. It is preferred to provide means for constantly urging the valve surface 333 into tight sealing engagement with the face 332 of the block 100. A portion of the opening 335 is enlarged in diameter to receive a compression spring 336. The spring 336 is engaged under compression between the head of the shaft 334 and a shoulder 337 on the wall of the opening 335 to constantly press the valve 19 against the face 332. The mechanism for rotating the valve 19 will be described before entering upon a description of the port system associated with the valve.

A pair of diametrically opposite pins 338 projects from the outer side of the valve 19 and a plate 339 is secured to the pins 338. The plate 339 is spaced from the outer face of the valve 19 by rollers or spacers 340 on the pins. A pendulum 341 extends through an axial opening 342 in the valve block 100 and passes between the spaced pins 338. A head on the end of the pendulum 341 presents shoulders 343 which are alternately engageable with the pins 338 to turn the valve 19. The pendulum 341 or the stem which carries the pendulum is in the nature of a flexible leaf spring, and its outer end is connected with the end of a lever 344 by a suitable pivot connection 345. The inner end of the lever 344 is pivotally or hingeably supported by a bracket 346 on a fixed plate 347 of the case 10; see Figure 9. The lever 344 is curved to extend around the outer portion of the tube 104. An arm 348 projects from the lever 344 at a point between its ends, and is engageable by the lug 133 on the collar 131 when the axial feed piston 129 approaches the outer end of its movement. Accordingly, each time the piston 129 returns to its outermost position the lever 344 is swung outwardly and the pendulum 341 is moved outwardly.

Means is provided for operatively connecting the pendulum 341 with the carriage B, or rotating assembly, so that the engagement of the shoulders 343 with the valve pins 338 is determined by the rotary motion of the carriage assembly. An arm 349 is secured to the bar 50 and curves around the central cylinder 95 to a point adjacent the valve 19. A spring 350 is connected between the arm 349 and the end of the pendulum 314. It will be seen that each time the carriage assembly rotates, the arm 349 and the spring 50 transmit movement to the pendulum 341. The parts are related so that the pendulum 341 is swung from one side to the other with each successive partial rotation of the carriage assembly. The broken lines in Figure 30 illustrate the manner in which the arm 349 and the spring 350 move to change the position of the pendulum. The cooperation of the pendulum shoulders 343 with the pins 338 is similar to the action of an escapement mechanism. Each time the pendulum 341 moves outwardly, one of its shoulders 343 engages a pin 338 to turn the valve 19. The successive partial rotations of the carriage in opposite directions condition the pendulum so that its shoulders 343 alternately engage the pins 338 to transmit partial rotation to the valve 19, the direction of rotation of the valve being reversed with each movement. It will be seen that the direction of rotation of the valve 19 is determined by rotation of the carriage B and that the rotation of the valve is produced by outward movement of the piston 129.

The port system controlled by the valve 19 includes a branch port 351 of the main air supply passage 283. The port 351 is further branched to have two spaced ports 352 and 353 leading outwardly to the valve face 332; see Figure 28. The port 352 is provided to supply actuating air pressure to the bucking bars 20 as will be later described. The port 353 forms the air supply port for the carriage rotating cylinders 122. Ports 354 lead through the valve block 100 from the cylinders 122 to the face 332. Portions of the ports 354 may be defined by grooves 355 provided in a plate 356 attached to the block 100, the grooves being covered by a second plate 357. The ports 354 are spaced at opposite sides of the air pressure supply port 353 at the valve face 332 and the three ports are in an arcuate row concentric with the axis of rotation of the valve 19. An exhaust port 358 is spaced circumferentially from each port 354 and the exhaust ports lead to the atmosphere. Regulable exhaust valves 359 are provided in the ports 358 and may be set to provide for any selected rate of rotation of the carriage B. The surface 333 of the valve 19 has three spaced arcuate grooves 360 for cooperating with the ports in the valve block 100. When the valve 19 is in the position illustrated in Figure 24 of the drawings, an end groove 360 connects one cylinder port 354 with its related exhaust port 358 to provide for exhaust of air from one cylinder 122 and the intermediate groove 360 connects the other cylinder port 354 with the pressure supply port 353 so that air under pressure is supplied to the other cylinder 122 to drive its piston 123 outwardly. The valve 19 is reversed when in the position illustrated in Figure 30 so that the other end groove 360 connects the second named cylinder port 354 with its related exhaust port 358, and the intermediate groove 360 connects the first named cylinder port 354 with the pressure supply port 353. When the valve is in the position of Figure 30, air under pressure is supplied to the first named cylinder 122, and air is allowed to exhaust from the second named cylinder 122. Thus with each partial rotation of the valve 19, one piston 123 is operated outwardly and the other piston 123 is allowed to move inwardly under the control of an exhaust valve 359. As above described, the pistons 123 serve to alternately rotate the carriage B in opposite directions.

The bucking bars 20 serve to back up or buck the rivets driven by the riveting means 12. The portable unit described above is adapted for use when the rivets are to be manually bucked, but where the operation is being carried on in connection with a frame or jig, it is preferred to associate the automatic bucking bars with the portable unit so that only one operator is required in performing the entire series of drilling, riveting and bucking operations. Figures 42 and 43 illustrate a bucking bar structure that is automatically controlled by the above described portable unit. The jig includes a rear or inner frame structure complementary to the outer frame and comprising intersecting members 362 spaced rearwardly from the work assembly A. The particular work assembly illustrated includes angle stringers 363 and sheets 364 arranged in front of the stringers. The frame members 362 are in generally parallel relation to the stringers 363. It will be assumed that the rivets to be installed are intended to secure the sheets 364 to the stringers 363.

The bucking bars 20 are elongate elements arranged in adjacent parallel or side-by-side relation to the frame members 362. The bars 20 are guided for movement toward and away from the work. In Figure 3 I have shown the bars arranged to have their inner sides slidably bear on plates 365 secured to the frame members 362 and adapted to rest against the sides of the stringers 363. Slots 366 are provided in the bars 20 and headed pins 367 project from the frame members 362 and operate in the slots to further guide the bars 20; see Figure 43. The heads of the pins 367 prevent lateral displacement of the bars. The active faces of the bars 20 are preferably designed to flatly bear against the work. I have shown the active edges of the bars 20 provided with multiplicities of spaced notches 368. The notches 368 are similar to the above described notches 232 and are substantially aligned therewith. The notches 368 are adapted to receive and shape the ends of the rivets as the rivets are bucked and are adapted to receive the projecting parts of the previously installed rivets so that the bucking bars may flatly engage against the work or stringers 363. It is to be understood that the bars 20 may be shaped to conform to stringers and other work parts of various shapes. Spaced tension springs 369 are connected between the bars 20 and the frame members 362. The springs 369 normally hold the bars retracted from the stringers 363 where they cannot interfere with the free operation of the drill D.

A cylinder and piston system is provided for simultaneously operating a plurality of bucking bars. It may be preferred to divide the rear portion of the jig frame into several working sections and operatively relate the bars so that the bars 20 of an individual section may be simultaneously operated independently of the bars 20 at the other sections. One or more cylinders 370 are associated with each bar 20; see Figure 3. The cylinders 370 are secured to the sides of the frame members 362 and the pistons 371 which operate in the cylinders, have stems 372. The stems 372 project from the cylinders 370 and are adapted to engage the rear edges of the bucking bars. A system of tubes or pipes 373 connects the several cylinders 370 of the working section of the jig. The pipe system 373 in turn communicates with a common line or hose 374. The hose 374 extends to a port 375 in the block 157 of the portable unit. The hose 374 is preferably flexible to permit free manipulation of the portable unit. A pipe 376 extends from the port 375 to a port 377 in the valve block 100.

The above described selector valve 19 operates to govern the delivery of actuating air pressure to the cylinders 370 of the bucking bars. The port 377 leads to the valve face 332 and has its end spaced from the end of the above mentioned pressure supply port 352. An exhaust port 378 is provided in the block 100 and has its end spaced at the opposite side of the port 377. The ports 352, 377 and 378 constitute an arcuate row or series at the face 332. Spaced arcuate grooves 379 are provided in the surface 333 of the valve 19 to cooperate with the ports. During the first phase of operation of the machine when the rivet is fed into the chuck C and the opening is being drilled in the work assembly A by the means 11, one groove 379 connects the port 377 with the exhaust port 378 so that the springs 369 hold the bucking bars 20 in the retracted positions. When the carriage B is rotated to bring the riveting means 12 into alignment with the opening 40, the valve 19 is rotated and the other groove 379 assumes a position where it connects the port 377 with the pressure port 352. This allows the actuating air pressure to be delivered to the several bucking bar cylinders 370 and the bars are simultaneously moved into pressure engagement with the stringers 363.

After the riveting operation when the carriage rotates to move the drilling means 11 toward its operative rotative position, the valve 19 is rotated back to the position where the groove 379 connects the port 377 with the exhaust port 378, thus cutting off the actuating air pressure from the cylinders 370 and allowing the air to freely exhaust from the cylinders. From the above it will be seen that the bucking bars 20 are automatically put into operation immediately preceding the operation of the riveting means 12 and are allowed to retract away from the work at the completion of the riveting operation.

Simple effective means is provided to close the main air supply valve 223 at the completion of the riveting and bucking operation. This means includes a plunger 380 slidably guided in an axial opening 381 in the plate 105; see Figure 5. A bracket 382 is secured to the plate 105 and the plunger 380 is also guided in an opening in the bracket. A spring 383 is arranged under compression between the bracket 382 and a nut 384 on the plunger to normally urge the plunger outwardly. The plunger 380 is engaged and depressed by a lever 222 when the handle ring 263 is operated to open the valve 223. A ratchet dog or arm 385 similar to the above described arms 305 is turnably supported on a pin 386 carried by the bracket 307 on the blade 137 of the drilling means 11. The outer end of the arm 385 has a notch 387 adapted to receive the rounded outer end of the plunger 380. A torsion spring 388 is anchored to the pin 386 and is connected with the arm 385 to urge the arm to a pitched or inclined position. When the riveting means 12 has moved away from the work assembly A at the completion of the riveting operation and the carriage B is rotating to bring the drilling means 11 into alignment with the opening 40, the notch 387 of the arm 385 engages the end of the plunger 380. As the rotation of the carriage continues, the arm 385 is swung toward an axial position with the result that the plunger 380 is forced outwardly. The plunger in turn moves the lever 222 outwardly and the several toggle levers snap over center to move the valve 223 to the closed position to terminate operation of the entire apparatus by cutting off the main air pressure supply.

Operation

To prepare the tool for operation a number of rivets are introduced into the track groove 152 and the follower 162 is set to urge the rivets along the track. It will be assumed that the work assembly has been properly secured in the jig and is in condition to be riveted together. The portable unit is suspended on the line 30 so that it may be readily handled by the operator and the air lines 251 and 374 are connected with the unit. The operator brings the portable unit to the position where the work is to commence and engages the channel 238 with a frame element 231 so that its lug 239 enters a notch 232 in the adjacent element 231 of the jig frame to locate the tool. In this connection it is to be understood that the portable unit may be arranged in any required position for operation. That is, it may be disposed in a vertical position, a horizontal position, or an inclined position. With the portable unit in the selected position the valve handle ring 263 is operated to open the main valve 223. This admits air pressure to the main air supply port 283 and actuating air pressure is instantly supplied to the cylinder tube 229 to operate the foot clamp lever L. This clamps the foot 226 against the work assembly A and clamps the channel 238 against the frame element 231 to secure the portable unit in its operative position at the work assembly.

Actuation of the lever L of the clamp means 16 produces rotation of the bell crank 197. Assuming that the rivet selecting means 15 has been primed or conditioned by an initial operation of valve 223 to advance a rivet to the end of the track 154, the operation of the bell crank 197 swings the lever 182 toward the member 153. This causes the surface 190 to advance the endmost rivet to the locator notch 181 to be in position for movement with the set 59 by the feed foot 203.

At the initiation of operation of the tool the reciprocating valve 18 is in its outer position, and air is supplied to the port 325 from the air supply port 317 so that the axial feed piston 129 is held in its outer position. When the operation is started, the rotary valve 19 is in the position where air under pressure is supplied to the piston 123 which rotates the drilling means 11 to its operative position in alignment with the opening 40. The rotation of the drilling means 11 toward the opening 40 brings its dog or arm 305 into cooperation with the pin 304 of the lever 301 to rotate the lever and thus move the reciprocating valve 18 to its inner position. This brings the groove 313 of the reciprocating valve to the position where the groove connects the port 316 with the supply port 317 so that actuating air pressure is supplied to the outer end of the cylinder 95. The inward movement of the valve 18 also brings the head 324 into cooperation with the seat 322 so that air is obliged to discharge from the inner end of the cylinder 95 through the exhaust valve 319. Thus the movement of the drilling means 11 toward the work assembly A is governed by the exhaust valve 319. The drilling means 11 starts to move toward the work assembly as soon as it reaches the operative rotative position in alignment with the opening 40. When the drilling means 11 reaches its operative position its lug 140 moves into the notch 142 to connect the drilling means with the axial feed piston 129.

The rotation of the carriage B during movement of the drilling means 11 toward its rotative operative position operates the manifold valve 17 to the position where air pressure is supplied to the tube 289 and port 290 to flow through the passage 51 to the interior of the drilling means body 32. Thus the drill D is caused to rotate as the drilling means 11 is turned toward its operative rotative position, and while it is being moved toward the work assembly A. The rotation of the carriage also brings the groove 288 of the manifold valve 17 into registration with the port 292 so that air pressure is supplied to the rivet feed cylinder 216 through the port 292, groove 315 and port 330. The final portion of rotation of the carriage B reverses the valve 18 so that the groove 315 connects the port 292 with the cylinder port 330. Thus the actuation of the piston 217 is delayed until the reciprocating valve 18 is reversed and is further delayed by the action of the delay valve 415. Actuation of the piston 217 in the cylinder 216 rotates the lever 214 to move the rivet feed foot 203 outwardly. Prior to this operation the rotation of the carriage has ceased and the set 59 has come into contact with the rivet at the foot 203. The outward movement of the foot 203 is imparted to the riveting means 12 by the rivet. The riveting means 12 is moved outwardly to its outermost position. When this outermost position has been reached, the resistance of the springs 212 and 213 is overcome by the piston 217 and the lever 207 pivots to close the chuck jaws 173 around the rivet. During the above described introduction of the rivet into the chuck C and the closing of the chuck, the drill D has continued to rotate and has been fed downwardly through the opening 40 and against the work assembly A to drill an opening in the work. Thus the rivet is engaged in the chuck C during the drilling operation.

When the drill D approaches the end of its active stroke a screw 299 engages the lever 29 and rotates the lever to move the reciprocating valve 18 to its outer position. It is to be noted that the screw 299 may be adjusted to determine the operative travel of the drill D. The reversal of the valve 18 brings the groove 313 to the position where it connects the air supply port 317 with the port 325 so that air pressure is supplied to the inner end of the cylinder 95 to move the piston 129 and the drilling means 11 outwardly. This provides for the automatic retraction of the drill D immediately following the drilling of the opening in the work. The reversal of the valve 18 also brings the groove 314 to the position where it connects the ports 316 and 328 so that the exhaust of air from the outer end of the cylinder 29 is controlled by the regulable exhaust valve 329 and the outward travel of the drilling means is governed thereby. Reversal of the valve 18 further connects the rivet feed cylinder port 330 with the exhaust port 331 so that pressure is free to exhaust from the cylinder 216. The drill D continues to rotate as the drilling means 11 moves outwardly so that the drill effectively clears itself from the drilled opening. When the drilling means 11 approaches its outer position, the lug 133 on the collar 131 engages the arm 348 to swing the lever 344 outwardly and thus move the pendulum outwardly to reverse the selector valve 19.

The reversal of the selector valve 19 brings the groove 379 to a position where it connects the port 377 with the pressure port 352. This automatically provides for the delivery of actuating air pressure to the cylinders 370 so that the bucking bars 20 are simultaneously brought into pressure engagement with the work. It will be observed that the bucking bars 20 remain spaced from the work assembly A during the drilling operation so that they are not engaged by the drill D and the bucking bars are put into operation shortly before the riveting operation.

Reversal of the selector valve 19 brings the groove 360 to the position where it connects the air pressure supply port 353 with the cylinder port 354 supplying air pressure to the piston 123 which rotates the carriage B in the direction to bring the riveting means 12 to its operative rotative position. As the carriage begins to rotate, the lug 140 of the drilling means 11 moves out of the notch 142 and as the rotation continues, the lug 141 of the riveting means 12 moves into the notch 142. This connects the riveting means 12 with the rod 130 so that it may be advanced toward the work assembly A by the piston 129. During the rotation of the carriage to bring the riveting means 12 to its operative position, a dog or arm 305 engages the pin 304 to swing the lever 301 over center and thus reverse the reciprocating valve 18. The reversal of the valve 18 to its inner position brings the groove 313 to the position where it connects the ports 316 and 317 so that air under pressure is supplied to the outer end of the cylinder 95 and brings the head 324 into cooperation with the seat 322 so that air from the inner end of the cylinder must escape through the regulable exhaust valve 319. The reversal of the valve 18 to its inner position provides for the actuation of the piston 129 to move the riveting means 12 toward the work assembly A.

Rotation of the carriage B to bring the riveting means 12 to its operative rotative position results in rotation of the manifold valve 17. Rotation of the manifold valve 17 also brings the tube 287 to the position where it communicates with the supply port 284 and brings the port 286 into communication with the passage 69 so that actuating air pressure is supplied to the ports 70 and 71 of the riveting means 12.

As the riveting means 12 moves toward the work assembly A its chuck jaws 173 carrying the rivet pass through the opening 250 and the rivet is entered into the drilled opening in the work. The fingers 178 of the jaws 173 cooperate with the plate 279 and the continued advancement of the riveting means 12 causes the jaws to open. This leaves the rivet free in the drilled opening for engagement by the set 59. The set 59 of the riveting motor 57 backed up by the spring 416 presses the rivet home with a given pressure to hold the work parts in tight contact for the riveting operation. Continued advancement of the case 56 after the set 59 and the riveting motor 57 have stopped, brings the grooves 72 and 77 into communication so that actuating air pressure is supplied to the riveting motor 57. Thus the riveting means 12 is automatically put into operation almost immediately following the introduction of the rivet into the drilled opening. The riveting means drives the rivet so that it is upset at the rear of the work assembly by the cooperating bucking bar 20. The rivet is upset to partially conform to the notch 368 of the bucking bar. The riveting period is determined by the setting of the valve 85 as described in detail above.

The final advancement of the riveting means 12 brings the screw 299 associated therewith into cooperation with the lever 297 to rotate the same and move the valve 18 to its outer position. This reversal of the valve 18 provides for the delivery of air pressure to the inner end of the cylinder 95 and the exhaust of air from the outer end of the cylinder 95 through the exhaust valve 329. Thus the riveting means 12 is moved outwardly at the completion of the riveting operation. As the riveting means 12 approaches the end of its outward movement, the lug 133 engages the arm 348 to swing the lever 344 and move the pendulum 341 outwardly. The pendulum, which was conditioned by the prior rotation of the carriage, moves outwardly to reverse the selector valve 19. The reversal of the valve 19 causes air pressure to be supplied to the piston 123, which is operable to rotate the carriage B in the direction to move the drilling means 11 toward its operative rotative position. The reversal of the valve 19 also brings the groove 379 to the position where the port 377 communicates with the exhaust port 378 so that air may exhaust from the bucking bar cylinders 370. The springs 369 retract the bucking bars 20 from the work assembly A. The rotation of the carriage that results from reversal of the valve 19, moves the manifold valve 17 to cut off the supply of air pressure to the riveting means 12. As the carriage rotates, the arm 385 cooperates with the push rod 380 to move the same outwardly. The rod 380 acting on the lever 222 throws the toggle levers over center so that the main valve 223 is returned to the closed position. This cuts off the supply of actuating air pressure to the machine and the principal lines of the pressure system are free to bleed the remaining air pressure out through the port 260. A a result of this the lever L is returned to its idle position by the spring 246. This frees the channel 238 from the jig element 231 and allows the foot 226 to be moved free of the work assembly A so that the portable tool may be moved to position for the next drilling and riveting operation. The movement of the lever L to its idle position results in movement of the lever 132 away from the member 153. Upon this movement of the lever 182 the surfaces 188 and 191 advance the next rivet along the track 154 to the position where it will be engaged by the face 190 and advanced to the locating notch 181 at the next operation of the clamp means 16. Thus the machine is automatically conditioned for the succeeding operation.

Having described only a typical form of the invention I do not wish to be limited to the specific details herein set forth, but wish to reserve to myself any variations or modifications that may appear to those skilled in the art or fall within the scope of the following claims.

I claim:

1. A portable drilling and riveting tool comprising a case, a turnable carriage in the case, drilling means and riveting means supported by the carriage to turn therewith and for independent axial movement toward and away from the work assembly, fluid pressure actuated means for clamping the tool against the work assembly, a second fluid pressure actuated means for turning the carriage to alternately position the drilling and riveting means in alignment with a given point on the work assembly, a third fluid pressure actuated means for advancing the drilling means axially toward the work assembly, when aligned with said point, to drill an opening in the work and for advancing the riveting means toward the work assembly, when the same is aligned with said point, and automatic control means for the three fluid pressure actuated means.

2. A portable drilling and riveting tool comprising a case, a turnable carriage in the case, drilling means and riveting means supported by the carriage to turn therewith and for independent axial movement toward and away from the work assembly, fluid pressure actuated means for clamping the tool against the work assembly, a second fluid pressure actuated means for turning the carriage to alternately position the drilling and riveting means in alignment with a given point on the work assembly, a third fluid pressure actuated means including an element movable toward and away from the work following each rotary motion of the carriage, means made operative by rotary motion of the carriage for releasably and selectively connecting the drilling and riveting means with said element to be moved toward and away from the work so that the drilling means drills an opening in the work and the riveting means later drives a rivet inserted in the opening, and automatic control means for the three fluid pressure actuated means.

3. In apparatus of the character described for use with a relatively stationary work supporting jig having frame elements, a plurality of bucking bars for pressure engagement with one side of the work, cylinder and piston means for operating each bar, and a unit manually movable with respect to the jig and arranged at the other side of the work, the unit including fluid pressure actuated drilling means for drilling an opening in the work, fluid pressure actuated riveting means for driving a rivet in said opening, and means at the riveting means for controlling delivery of actuating fluid pressure to the drilling means, cylinders and riveting means.

CHARLES A. DAWSON.

REFERENCES CITED

The following references are of record in the file of this patent:

UNITED STATES PATENTS

| Number | Name | Date |
|---|---|---|
| 641,317 | Moore | Jan. 16, 1900 |
| 1,081,447 | Havener | Dec. 16, 1913 |
| 1,215,000 | Cone | Feb. 6, 1917 |
| 1,432,397 | Kanownik | Oct. 17, 1922 |
| 1,469,395 | Richard | Oct. 2, 1923 |
| 1,491,902 | Coble | Apr. 29, 1924 |
| 1,750,144 | Wisti | Mar. 11, 1930 |
| 1,810,227 | Shea | June 16, 1931 |
| 1,858,001 | Corson et al. | May 10, 1932 |
| 2,063,691 | Marchant | Dec. 8, 1936 |
| 2,216,403 | Oeckl et al. | Oct. 1, 1940 |
| 2,246,494 | Amiot | June 24, 1941 |
| 2,330,859 | Bench et al. | Oct. 5, 1943 |
| 2,319,003 | Lear | May 11, 1943 |
| 2,356,526 | Mayer et al. | Aug. 22, 1944 |